United States Patent [19]
Haghiri et al.

[11] Patent Number: 4,985,767
[45] Date of Patent: Jan. 15, 1991

[54] SPATIO-TEMPORAL SUB-SAMPLING OF DIGITAL VIDEO SIGNALS REPRESENTING A SUCCESSION OF INTERLACED OR SEQUENTIAL IMAGES, TRANSMISSION OF HIGH-DEFINITION TELEVISION IMAGES, AND EMISSION AND RECEPTION STAGES FOR SUCH A SYSTEM

[75] Inventors: Mohammad R. Haghiri, Sceaux; Philippe Guntzburger, Epinay-sous-Senart; Marcel Le Queau, Ozoir la Ferriere, all of France

[73] Assignee: U. S. Philips Corporation, New York, N.Y.

[21] Appl. No.: 313,937

[22] Filed: Feb. 22, 1989

[30] Foreign Application Priority Data

Feb. 23, 1988 [FR] France ................. 88 02121
Apr. 15, 1988 [FR] France ................. 88 05010
Jun. 28, 1988 [FR] France ................. 88 08652
Jul. 8, 1988 [FR] France ................. 88 09294

[51] Int. Cl.$^5$ ............................................. H04N 7/12
[52] U.S. Cl. ..................... 358/133; 358/138; 358/140
[58] Field of Search ........... 358/140, 105, 133, 138, 358/141, 11, 12

[56] References Cited

U.S. PATENT DOCUMENTS 4,442,454 4/1984 Powell ..................... 358/167
4,713,688 12/1987 Guttner .................... 358/141
4,745,459 5/1988 Minomiya et al. ............ 358/12
4,845,561 7/1989 Doyle et al. ............... 358/140 X

FOREIGN PATENT DOCUMENTS 0255289 2/1988 European Pat. Off. .
8704034 7/1987 World Int. Prop. O. .
8705770 9/1987 World Int. Prop. O. .

OTHER PUBLICATIONS

"TV Bandwidth Compression System by Contour Interpolation", Ando et al.; *Electronics & Communications in Japan;* vol. 49, #6, 1966.
Colloque HDTV 87; Bernard et al.; Oct. '87.

Primary Examiner—Victor R. Kostak
Attorney, Agent, or Firm—Michael E. Marion

[57] ABSTRACT

In a device for spatio-temporal sub-sampling of digital video signals representing a succession of interlaced or sequential images divided into blocks of m×n points (m and n being positive integers), the device comprising, in series, a circuit for the spatial prefiltering of the said sequence of fields, which circuit is intended to deliver a succession of sequential images which are limited with respect to the bandwidth, a spatial sub-sampling circuit, and a temporal sub-sampling circuit: a motion estimator which on the basis of, on the one hand, signals corresponding to the even fields and on the other hand, signals corresponding to the odd fields, delivers one or more information items on the motion in an odd field with respect to the which surround it.

9 Claims, 18 Drawing Sheets

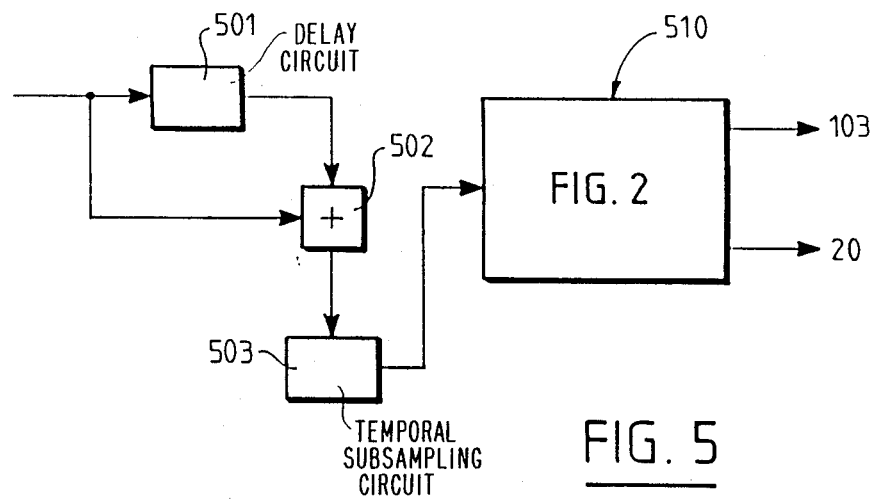
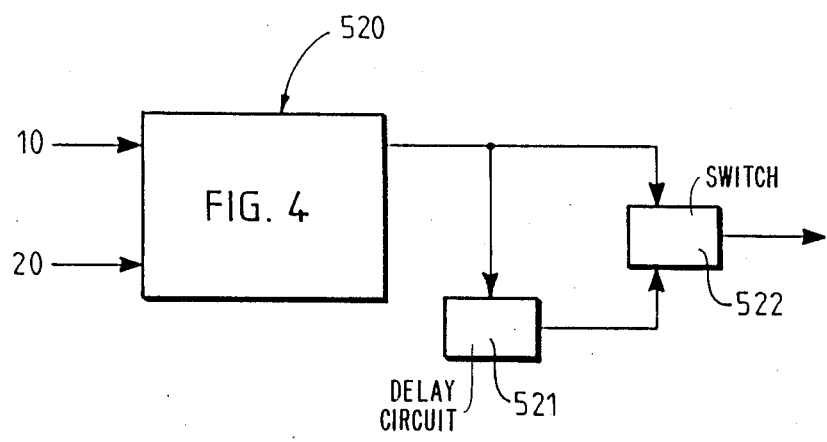

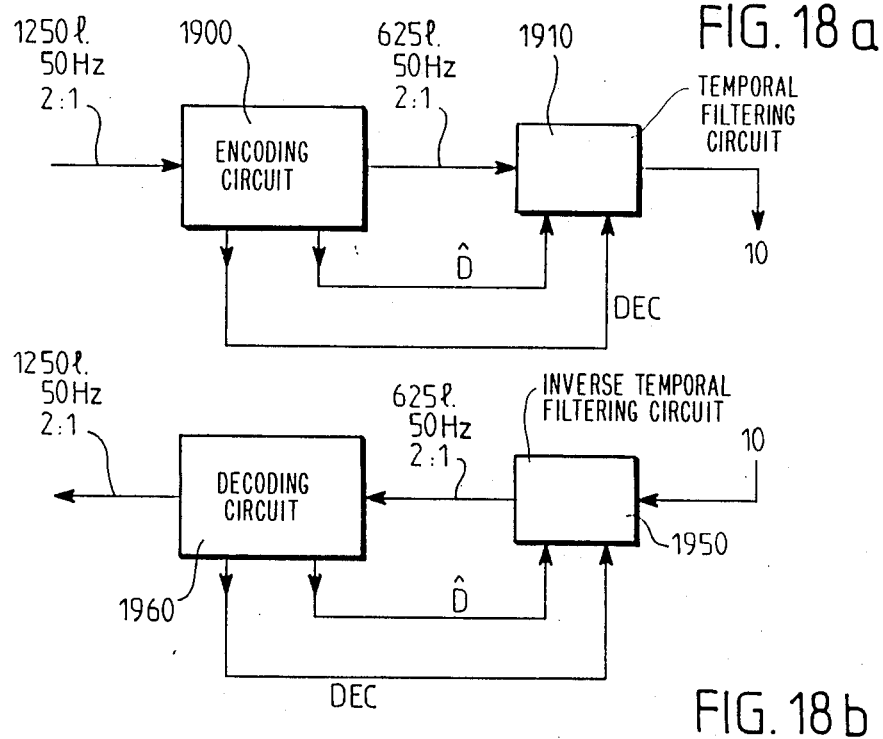
FIG. 18 a
FIG. 18 b
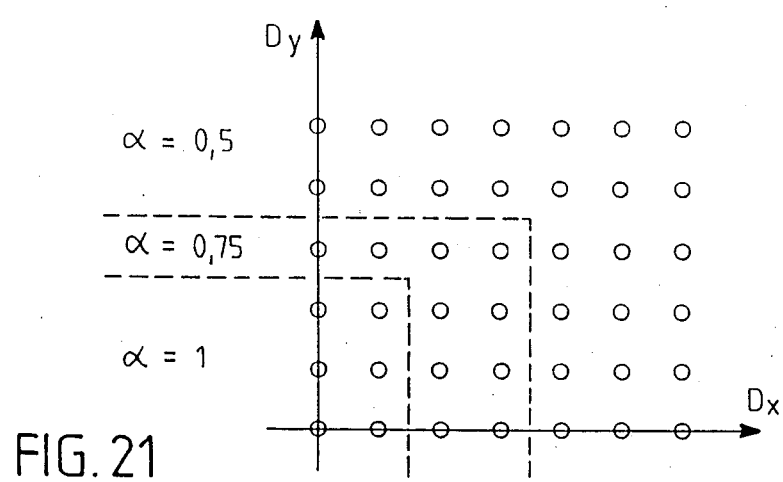
FIG. 21

SPATIO-TEMPORAL SUB-SAMPLING OF DIGITAL VIDEO SIGNALS REPRESENTING A SUCCESSION OF INTERLACED OR SEQUENTIAL IMAGES, TRANSMISSION OF HIGH-DEFINITION TELEVISION IMAGES, AND EMISSION AND RECEPTION STAGES FOR SUCH A SYSTEM

The present invention relates to a device for a spatio-temporal sub-sampling of digital video signals representing a succession of interlaced or sequential images divided into blocks of m×n points (m and n being positive integers), the device comprising, in series, a circuit for the spatial prefiltering of the sequence of images, which circuit is intended to deliver a succession of sequential images which are limited with respect to the bandwidth, a spatial sub-sampling circuit, and a temporal sub-sampling circuit.

The invention likewise relates to a system for transmission of high-definition television images including such a device, as well as to emission and reception stages for such a system.

The invention is, in fact, applicable essentially in the field of high-definition television. In a system for transmission of high-definition television images according to the MAC standard, it permits the reduction of the pass band of the television signals with a view to their transmission. It will be recalled at this point that the said transmission is ensured by means of an analogue channel which carries the data which have undergone the compression and that with this analogue channel there is associated an auxiliary channel referred to as the digital assistance channel permitting the transmission of supplementary information relating to the movements of the images transmitted by the analogue channel.

One problem arising from the compression of information which is necessary in order to match the quantity of this information to the limited pass band of the transmission channel, is maintaining the best possible spatial resolution, irrespective of the speed of displacement of the content of the images to be transmitted.

An object of the invention is therefore to propose devices permitting time sub-sampling and time interpolation, without appearance of the blurr and jerks which are traditionally observed, by reason of the temporal interpolation, in the presence of motion.

SUMMARY OF THE INVENTION

The subject of the invention is a device for spatio-temporal sub-sampling, characterized in that it also comprises a stage for the estimation of movement itself comprising means for delivering, on the one hand, signals corresponding to the even images 2k and 2k+2 and on the other hand signals corresponding to the odd images 2k+1, where k is an integer, and means for the estimation of movement intended to deliver, on the basis of the said signals, one or more information items on the movement of odd the image 2k+1 with respect to the even images of rank 2k and 2k+2 which surround it.

A further object of the invention is to propose, in a system for the transmission of high definition television images, a reception stage comprising, in its decoding part, a device for the reconstruction of images with compensation for movement which utilizes in an appropriate manner the estimation of movement undertaken on transmission.

To this end, such a reception stage is characterized in that it comprises, in its decoding part, a device for reconstructing images comprising, in series, a spatial postfiltering circuit intended to undertake a spatial interpolation in the sequential images transmitted by the analogue channel, a stage for the compensation for movement, a switch intended to deliver a succession of sequential images, and a format-conversion circuit for the transformation of this succession into a succession of interlaced images ready to be visually displayed, the stage for the compensation for movement comprising on the one hand two image memories in series for the storage of the images successively transmitted by the analogue channel and postfiltered and on the other hand an adder to form a sum of the transmitted images, and the switch receiving alternately, at its first input, the output of the said stage for the compensation for movement and, at a second input, the output of the spatial postfiltering circuit by means of a delay circuit with a delay equal to the interlacing period.

BRIEF DESCRIPTION OF THE DRAWINGS

The particular features and advantages of the invention will now appear in a more detailed manner in the description which follows and in the accompanying drawings, which are given by way of non-limiting examples and in which:

FIGS. 5 and 6 show modified embodiments incorporating the devices of FIGS. 2 and 4 respectively;

FIGS. 18a and 18b show a modified embodiment of the encoding device, with temporal filtering compensated in movement, as well as the corresponding decoding device;

FIG. 21 shows examples of values of the weighting coefficients according to the magnitude of the movement in the images;

DETAILED DESCRIPTION OF PREFERRED EMBODIMENTS OF THE INVENTION

Figure 1A:
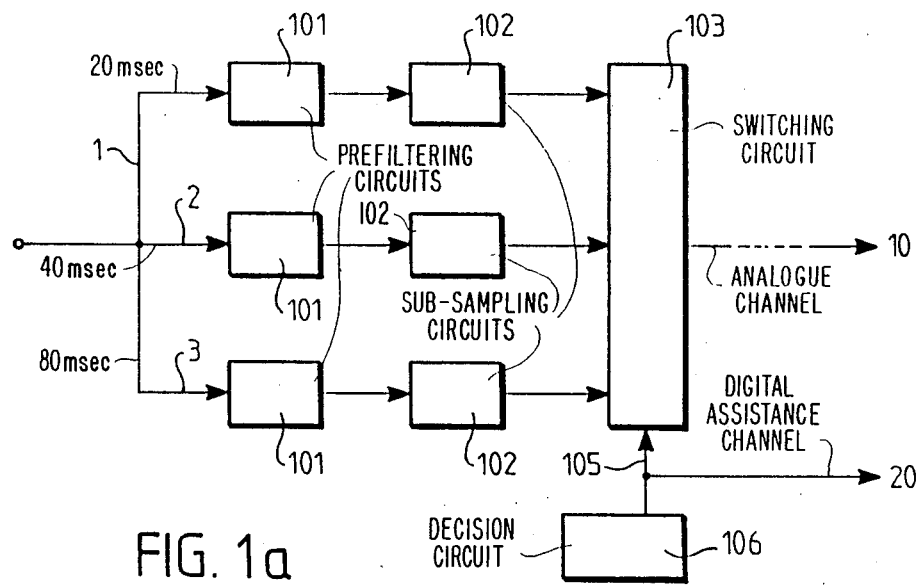
FIGS. 1a and 1b show respectively the encoding part, on the transmission side, and the decoding part, on the reception side, of a device for the estimation and for the compensation for movement, for a system for the transmission of television images.
Figure 1B:
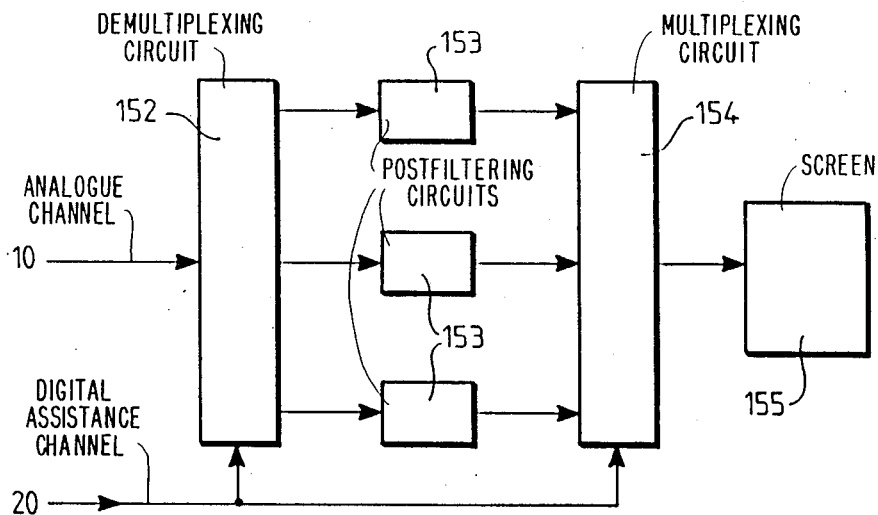

FIGS. 1a and 1b describes one embodiment of the invention suitable for the transmission of high-definition television images comprising means for encoding television images on transmission (FIG. 1a) and means for decoding the images on reception (FIG. 1b), which cooperate in order to detect and to estimate the movement within the images to be transmitted and to adapt the processing of the image data to the greater or lesser magnitude of this movement. The images are detected here by a high-definition television camera (not represented), which analyses the scene by means of an interlaced or sequential scanning at for example, 1250 lines and at the frequency of for example, 50 images per second. Naturally, the camera supplies, after matrixing of the color signals R, G, B, three types of signals: the luminance signal Y and the two colour difference signals U and V (or chrominance signal). Consequently, the description relates, for example, to the luminance signal, but would just as well be applied to the chrominance signal. Simply stated therefore, the output signal of the camera is sampled, and the resulting samples are presented to the input of the encoding means at a frequency of for example, 54 Megahertz in the case of an interlaced scanning and of 108 Megahertz in the case of a sequential scanning. As the transmission channel, in the case of the MAC standard, accepts only a rate of for example, 13.5 Megahertz, a sub-sampling must be carried out prior to the said transmission.

The images could be processed point by point, but it is simpler to break them down into N blocks of m×n points. Instead of operating a scanning of the points, there is then carried out a scanning of the blocks, to which N points representing the said blocks correspond.

The estimation of movement mentioned above is provided in the following manner. The encoding means represented in FIG. 1a is composed of a plurality of branches in parallel, for example three, referred to here as 1, 2 and 3. These branches receive the samples formed as indicated above and each comprise a prefiltering circuit 101 and a sub-sampling circuit 102. Although the sampling structures are different from one branch to another, the rates of sub-sampling are identical and in this case are equal to 4 for a succession of interlaced images and to 8 for a succession of sequential images. The patterns of the filters are selected in such a manner that the folding due to the sub-sampling is avoided. The outputs of the three sub-sampling circuits are passed to a switching circuit 103 which, depending upon the command received on a fourth input connection 105, ensures the selection of one or other of the said outputs with a view to its subsequent transmission via the analogue channel 10 of the transmission system.

The command present on the connection 105 of the switching circuit 103, which is normally identical for all the points of a block, is determined by a decision circuit 106, according to a criterion which is in general linked either to a quantity measured on the basis of the input image or to the energy of the difference between the processed images emerging from the prefiltering circuits 101 for example, and the original image. In the first case (a priori decision), the measured quantity may be, for example, the movement or the speed of the objects present in the image, and the decision is taken directly as a function of the value representing this quantity. In the second case (a posteriori decision), the energy of the difference permits the determination of the branch which leads to the best image reconstruction with the aid of the transmitted samples, and thus affects the switching. The information delivered by the decision circuit 106 is passed to a channel 20 referred to as the digital assistance channel.

In a similar manner, on reception, the corresponding decoding means, represented in FIG. 1b, comprises a demultiplexing circuit 152 which, on the basis of the signal transmitted via the analogue channel 10, supplies to three postfiltering circuits 153 in parallel images having appropriate regular structures. Finally, a multiplexing circuit 154 receives the outputs of these postfiltering circuits and permits, on the basis of the multiplexed signal, the generation of an image which can be visually displayed on a screen 155 with high resolution. The signal transmitted via the digital assistance channel 20 is supplied in parallel to the circuits 152 and 154.

The sub-sampling structures, which are different from one branch to the other, may be purely spatial or alternatively may permit the elimination of a certain number of images in the time direction. What is available then is a number of samples which is proportionately higher in order to represent the spatial contents of the images but which suffer degradation, in the case of movement, of the temporal contents reflecting this movement.

Two types of degradations may be more particularly found in the reconstructed image. Uniform movements are altered, the objects moving in jolts. Also resolution diminishes abruptly as soon as a fixed object becomes movable, by reason prefiltering and of the post-filtering. Both of these defects are visually very troublesome and the presence of an estimation and of a compensation for movement will provide a very significant remedy thereto, by eliminating the jerks and by preserving the resolution for a wider range of speeds.

The principle of motion compensation according to the invention is as follows. In the sequence of images being processed, one image in two is eliminated (that is to say the spatial information available at a determined instant t). Thus, if the rate or temporal frequency is, for example, 1/T where T corresponds to the time interval separating two successive images, the time interval after temporal sub-sampling will be 2T. Using $2k-1$, $2k$, $2k+1$, etc. ... to designate the successive ranks of the original image sequence, this signifies that the images associated, for example, with the instants $t+(2k-1)T$, t+(2k+1), etc. . . . , or in this case of odd images, are eliminated.

In parallel with this elimination of images, movement information is determined by a method of estimation of movement, providing for the allocation to each block of images to be eliminated, in this case odd images, of a displacement vector D such that the error of reconstruction of the block is minimal. This movement information is then utilized on reception to reconstruct the images eliminated before transmission, each block being reconstructed on the basis of the mean of the information items of two consecutive images in the direction of the movement associated with the block. This method improves upon the traditional solution for reconstruction of an odd frame (or even, respectively) which does so only on the basis of a preceding frame of opposite parity, this being a solution which exhibits the disadvantage of deforming the contours of solid objects.

The principle thus defined is applicable, for example, in a system for the transmission of high-definition television images and, principally, in the encoding part of the transmission stage of this system.

In the text which follows, the spatio-temporal sub-sampling carried out permits the obtaining of a rate of sampling of 4 (2 in spatial, 2 in temporal) for a succession of interlaced images and 8 (4 in spatial, 2 in temporal) for a succession of sequential images. The estimator of movement which will be utilized is based on the method referred to as the block correlation method (block matching method), with a search range equal to: horizontal displacement $\pm 3$, vertical displacement $\pm 3$. Nevertheless, this choice is not essential and should not limit the present invention, for the implementation of which an estimator of another type might certainly be used. It will likewise be stated here that the branches 1, 2, 3 correspond to differing speeds of displacement on the images, the base interval between images being, in the described example, 20 and 40 milliseconds for the branches 1 and 2 respectively and the base interval between transmitted elementary points having the same spatial position in the image being 80 milliseconds for the branch 3. It is in branches 2 and 3 that interest resides in preserving the best resolution, the movement being slower than in the case of the branch 1. The invention is therefore applicable to the branch 2, the extension to the branch 3 being described hereinbelow.

Figure 2:
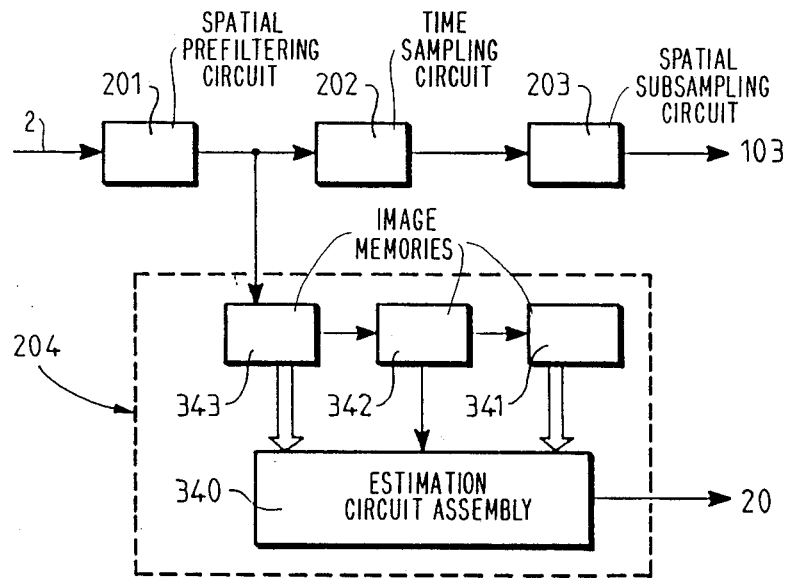
FIGS. 2 and 4 show, respectively in the encoding part, on the transmission side, and the decoding part, on the reception side, an embodiment of a device according to the invention, still in the case of a system for the transmission of high-definition television images.

According to the example represented in FIG. 2, the device according to the invention comprises first of all, on transmission, for branch 2, a spatial prefiltering circuit 201 receiving the input image, which is either an interlaced image for example 50 hertz, 2:1, 1250 lines, 54 M-samples ($=54.10^6$) per second or a sequential image for example 50 hertz, 1:1, 1250 lines, 108 M-samples per second. This circuit 201 permits the obtaining of a sequential image, limited with respect to its spatial band width in order to avoid the folding due to the temporal sub-sampling. The circuit 201 is followed, in series, by a time-sampling circuit 202 which divides by two the frame rate of the image (there is thus a transition to for example, 25 images per second), and then by a spatial sub-sampling circuit 203 which permits the reduction of the number of samples in each image plane (for example by means of a line quincunx sub-sampling which suppresses one point in two). At the output of the circuit 201 there is likewise provided, in parallel on the series connection of the circuits 202 and 203, a stage for the estimation of movement 204 which will now be described in detail.

The estimation of movement undertaken by the stage 204 has as its objective the determination, for each block of the image of rank 2k+1 (for example, odd images) which is eliminated, of a displacement vector D such that it is possible to obtain an approximation of the said image eliminated on the basis of a sum of the non-eliminated images which surround it (referred to hereinafter as "semi-sum"), in the present case on the basis of the semi-sum of the images 2k and 2k+2 (for example, even images). This approximation is here expressed by the relation (1), given in the appendix, as are the other mathematical expressions which appear in the part of the description which follows. In this relation, X designates the current block of the image 2k+1, D the movement vector when the estimation of movement has been applied to the images 2k and 2k+2, and $\hat{I}$ the approximation of the intensity of the point X of the current block of the image 2k+1.

This objective may likewise be formulated by stating that it is desired to associate with each block X of the image 2k+1 a vector $D_x$ such that the expression (3) is a minimum (this expression, in which DFD originates from the expression "Displaced Frame Difference", is the error of approximation associated with the current block and equivalent, for this block, as indicated by the expression (2), to the sum of the squares of the errors of approximation DFD on all the points of the block). This known principle of examination of the correlation between blocks (described in particular in the article by J. R. Jain and A. K. Jain, "Displacement measurement and its application in interframe image coding", which appeared in the journal IEEE Transactions on Communications, vol. COM-29, no. 12, December 1981, pages 1799 to 1808), is implemented in the stage for the estimation of movement 204 described here, in two steps which are distinct but extremely similar.

Figure 3A:
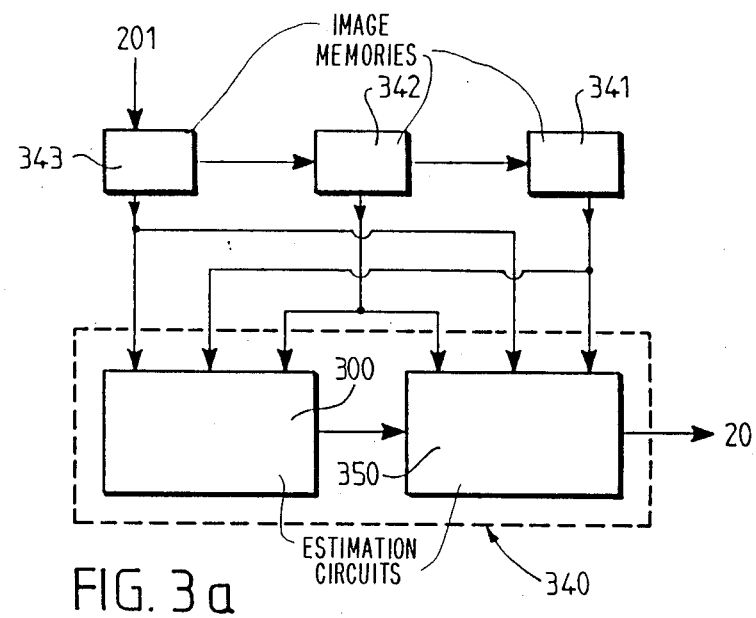
FIG. 3a shows in a more detailed manner an example of a stage for the estimation of movement in the device of FIG. 2, FIGS. 3b and 3d explain the content of the estimation circuits of the stage of FIG. 3a, and FIG. 3c shows an embodiment of the cells making up these estimation circuits.
Figure 3B:
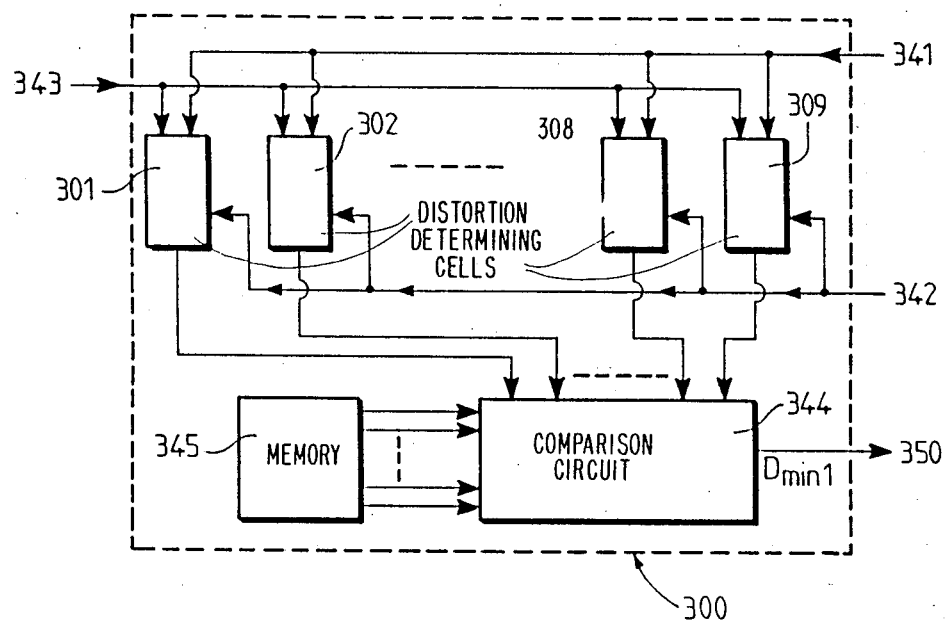
Figure 3C:
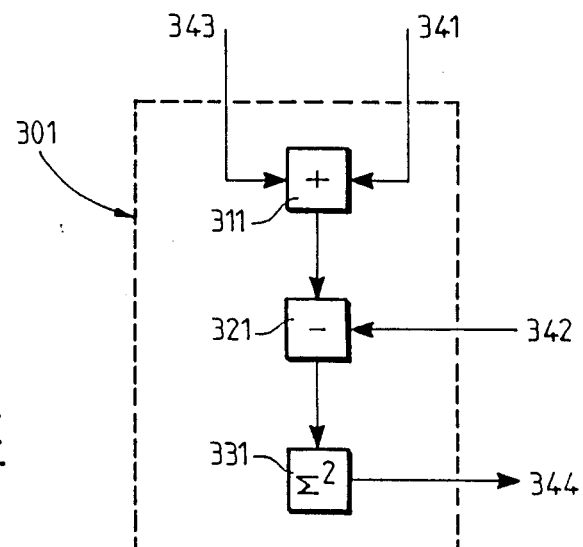

The stage for the estimation of movement 204, represented by way of non-limiting example in FIG. 3a, comprises, for the execution of these two steps, an assembly 340 of two estimation circuits 300 and 350 which are virtually identical, as well as three image memories in series 341, 342 and 343. The estimation circuit 300, for example, comprises, as indicated in FIG. 3b which gives a more detailed representation thereof, nine identical cells 301 to 309 determining nine distortions (or error of estimation as defined by the expression (3) or expression (2)) relative to the nine following displacements: $(D_x, D_y) = (2,2), (2,0), (2,-2), (0,2), (0,0), (0,-2), (-2,2), (-2,0), (-2,-2)$. These nine displacements are stored in a memory 345. Each one of the cells 301 to 309 itself comprises identical elements, and these elements considered, for example, for the first one of the nine cells, comprise, as indicated in FIG. 3c showing this first cell, an adder 311, which is intended to generate the semi-sum of the images of rank 2k and 2k+2 (referred to hereinafter as even images), and a subtracter 321 and, in series with these two elements, a squaring and summing circuit 331. The adder 311 receives the output of the image memories 341 and 343, and the semi-sum of the even images 2k and 2k+2 thus obtained is supplied to one input of the subtracter 321 which receives on its second input the output of the image memory 342 storing the image of rank 2k+1 (referred to hereinafter as "odd image(s)"). The output of the subtracter 321 is supplied to the squaring and summing circuit 331, the output of which constitutes the output of the cell 301.

Figure 3D:
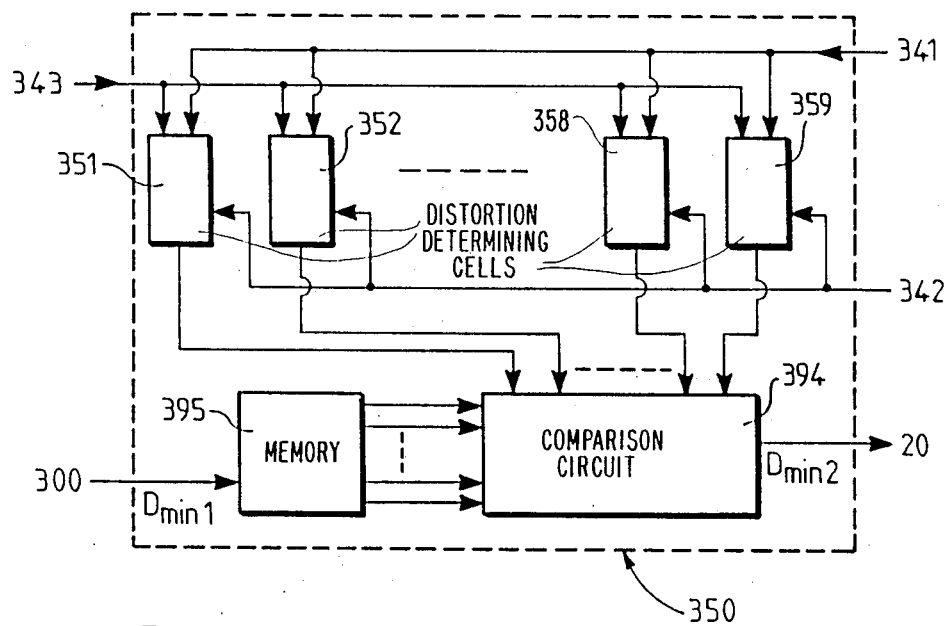

The nine respective outputs of the nine cells 301 to 309 are then supplied to a circuit for the comparison of the distortions 344, which compares the nine values of distortion thus originating from the nine cells and determines that one which is the lowest. That one of the nine displacements which leads to this minimum block distortion is referred to as $D_{min1}$ and, after extraction from the memory 345, is passed to the second estimation circuit 350. Ths circuit 350, represented in FIG. 3d, resumes exactly the same operations as the estimation circuit 300, but on nine other values of displacements which are the following: $(D_x, D_y) = D_{min1} + (1, 1)$, $D_{min1} + (1,0)$, $D_{min1} + (1, -1)$, $D_{min1} + (0, 1)$, $D_{min1} + (0, 0)$, $D_{min1} + (0, -1)$, $D_{min1} + (-1, 1)$, $D_{min1} + (-1, 0)$, $D_{min1} + (-1, -1)$, and which are this time stored in a memory 395 receiving $D_{min1}$.

The estimation circuit 350 comprises nine cells 351 to 359, themselves composed of identical elements which, considered, for example, as above, for the first of the nine cells, comprise an adder, a subtracter and a squaring and summing circuit, which are provided in series. The outputs of the nine cells 351 to 359 are supplied to a circuit for the comparision of the distortions 394, which determines the lowest distortion and permits the selection of the corresponding displacement $D_{min2}$, that is to say being that which minimizes the distortion for the current block X odd image $2k+1$.

The displacement selected in this manner is then passed to the digital assistance channel 20, while the output of the spatial sub-sampling circuit 203 is passed to the switching circuit 103. On reception, the device for compensation of movement receives a sequence of images at a rate of for example, 25 images per second, these images being spatially sub-sampled, and reconstructs a sequence of images of for example, 50 images per second, 1250 lines, 1440 points per line, either in interlaced format 2:1 with $54.10^6$ samples per second, or in sequential format with $108.10^6$ samples per second.

Figure 4:
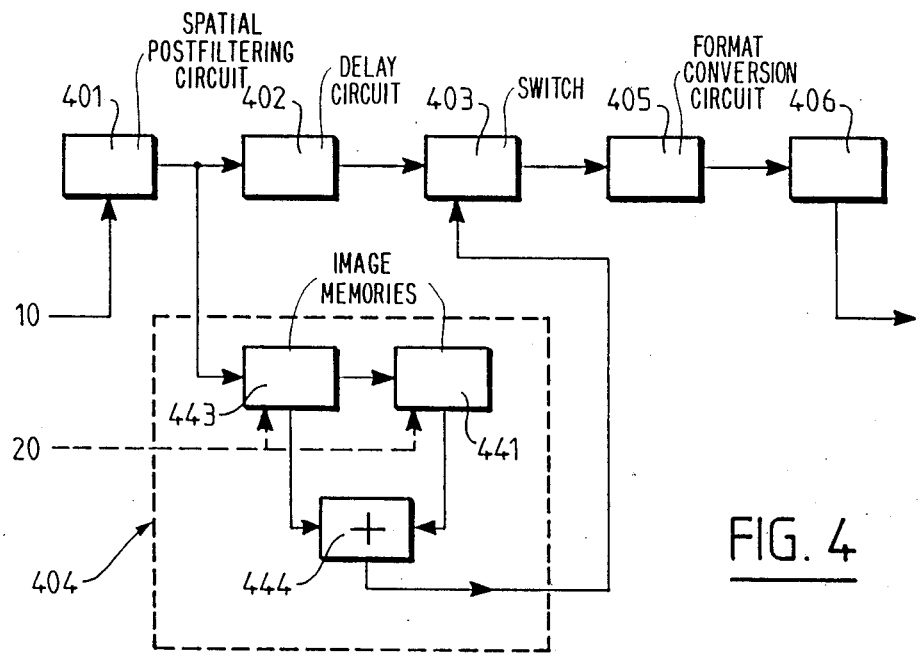

This device for the compensation of movement on reception comprises first of all, as indicated in the embodiment of FIG. 4, a spatial postfiltering circuit 401 undertaking a spatial interpolation in order to obtain a sequence of for example, 25 images per second, 1250 lines per image, 1440 points per line. This circuit 401 is followed by a delay circuit 402 (the delay introduced is in this case 20 milliseconds), and then by a switch 403 which permits, on the basis of two image sequences each having a period of 40 milliseconds but offset by 20 milliseconds, the reconstruction of a sequence having a period of 20 milliseconds. At the output of the spatial post-filtering circuit 401 there is moreover provided, in parallel on the series connection of the circuits 402 and 403, a stage for temporal interpolation compensated in movement 404.

This stage 404 comprises, on the one hand, two image memories in series 441 and 443, which store the two images successively transmitted by the analogue channel 10 and postfiltered, that is to say the two even images, and, on the other hand, an adder 444 which is placed at the output of the said memories and which permits the effecting of the semi-sum of the transmitted images, according to the expression (4), where X represents the coordinates of the current point, $D_{min2}$ the displacement attributed to the point and delivered by the digital assistance channel 20, $I(X - D_{min2}, 2K)$ and $I(X + D_{min2}, 2k+2)$ the intensity at the points associated with X on the transmitted even images of rank 2k and 2k+2 respectively (having regard to the estimated movement), and Î the intensity at the point X of the eliminated image to be reconstructed. The output of the adder 444 constitutes the second input of the switch 403.

The switch 403 thus receives on the one hand images 1:1 which are the even images 2k, 2k+2, etc. ... transmitted every 40 milliseconds and on the other hand images 1:1 which are the images Î estimated in accordance with the displacement transmitted by the channel 20 and the period of which is likewise 40 milliseconds, with an offset of 20 milliseconds in relation to the transmitted images. This switch 403 thus delivers a sequence of images having a rate of 20 milliseconds between images. A format-conversion circuit 405 transforms this succession of sequential images into a succession of high-definition interlaced images ready to be visually displayed. In the case where the succession of high-definition images is visually displayed in sequential format, the format-conversion circuit 405 is omitted.

The present invention is, of course, not limited to the embodiments described and represented hereinabove, on the basis of which modified embodiments or improvements may be provided without thereby departing from the scope of the invention.

The previously described device structures may, in fact, be modified in order to obtain a higher temporal sub-sampling rate, for example equal to 4. These modified structures are represented in FIG. 5, for the transmission part, and in FIG. 6, for the reception part.

The device for the estimation of movement on transmission then comprises, as indicated in FIG. 5 in the case of a succession of interlaced images, on the one hand the device of FIG. 2, in this case designated by the reference 510 and, on the other hand, at the input of this device 510, a maintenance temporal filtering circuit composed of a delay circuit 501 imposing a delay equal to T and of an adder 502, and a temporal sub-sampling circuit 503. The maintenance temporal filtering circuit (501, 502) receives the images of for example, 1250 lines, 50 Hz, 2:1 and supplies to its output a series of sequential images (1250 lines, 50 Hz, 1:1), the sampling of which permits the obtaining at the input of the device for the estimation of movement 510, of a series of sequential images of 1250 1, 25 Hz, 1:1. This sequence of images is processed by the device 510 which finally delivers a series of sequential images of period 80 milliseconds. In the case of a succession of sequential images, the functions of the circuits 501 and 502 is already carried out and these circuits are therefore omitted. The input images are then received directly by the circuit 503. Likewise, on reception, the device for the compensation for movement comprises, as indicated in FIG. 6, on the one hand the device of FIG. 4 designated in this instance by the reference 520 and on the other hand, at the output of this device 520, an interpolation circuit composed of a delay circuit 521 imposing a delay equal to T and of a switch 522. This interpolation circuit (521, 522) permits the transformation of the series of sequential images, for example, 1250 lines, 25 Hz, 1440 points per line present at the output of the device 520, into a sequence of interlaced images having a temporal rate of 20 milliseconds, that is to say into a series of images of 1250 lines, 50 Hz, 2:1, 54 M-samples per second, which is supplied to the multiplexer, the output of which constitutes the sequence of interlaced images of high-definition ready to be visually displayed. This same device (521, 522) also makes it possible to obtain sequential images for example, 1250 lines, 50 Hz, 1:1, 108 M-samples per second.

Figure 7:
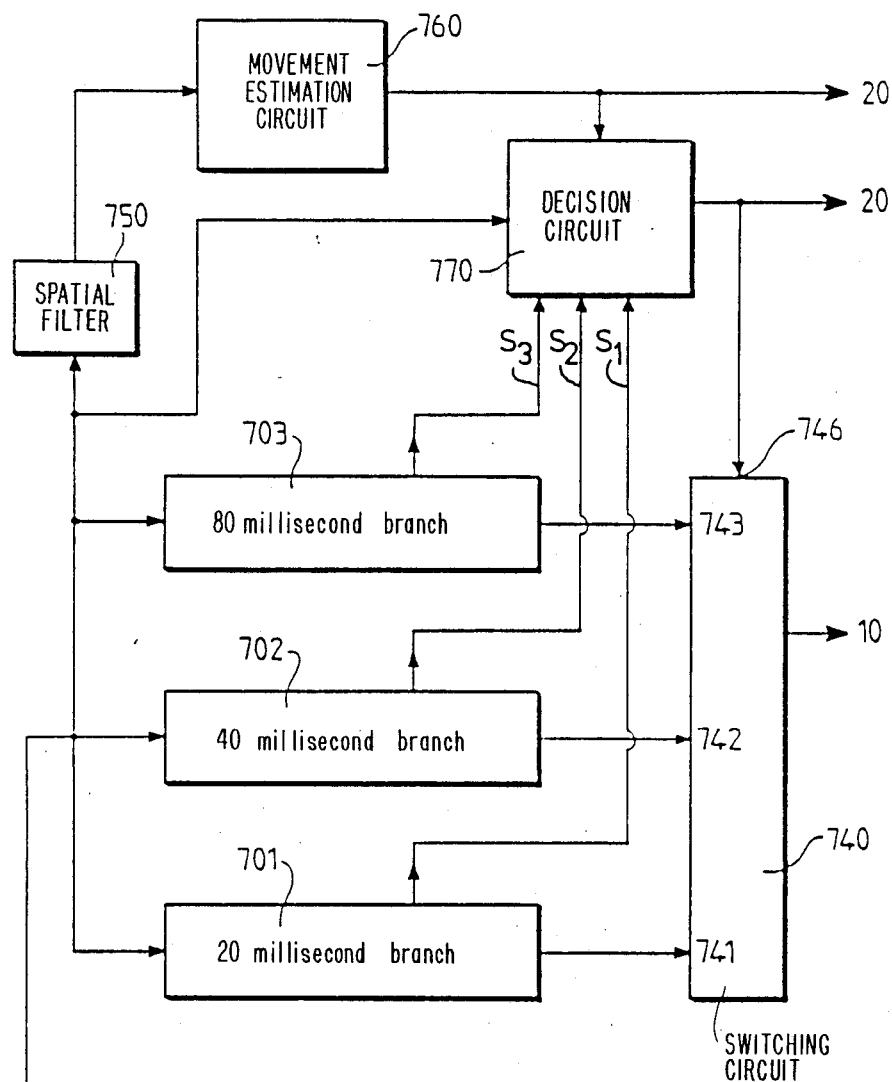
FIG. 7 shows an embodiment, in a system for the transmission of high-definition television images, of an encoding device according to the invention.
Figure 11:
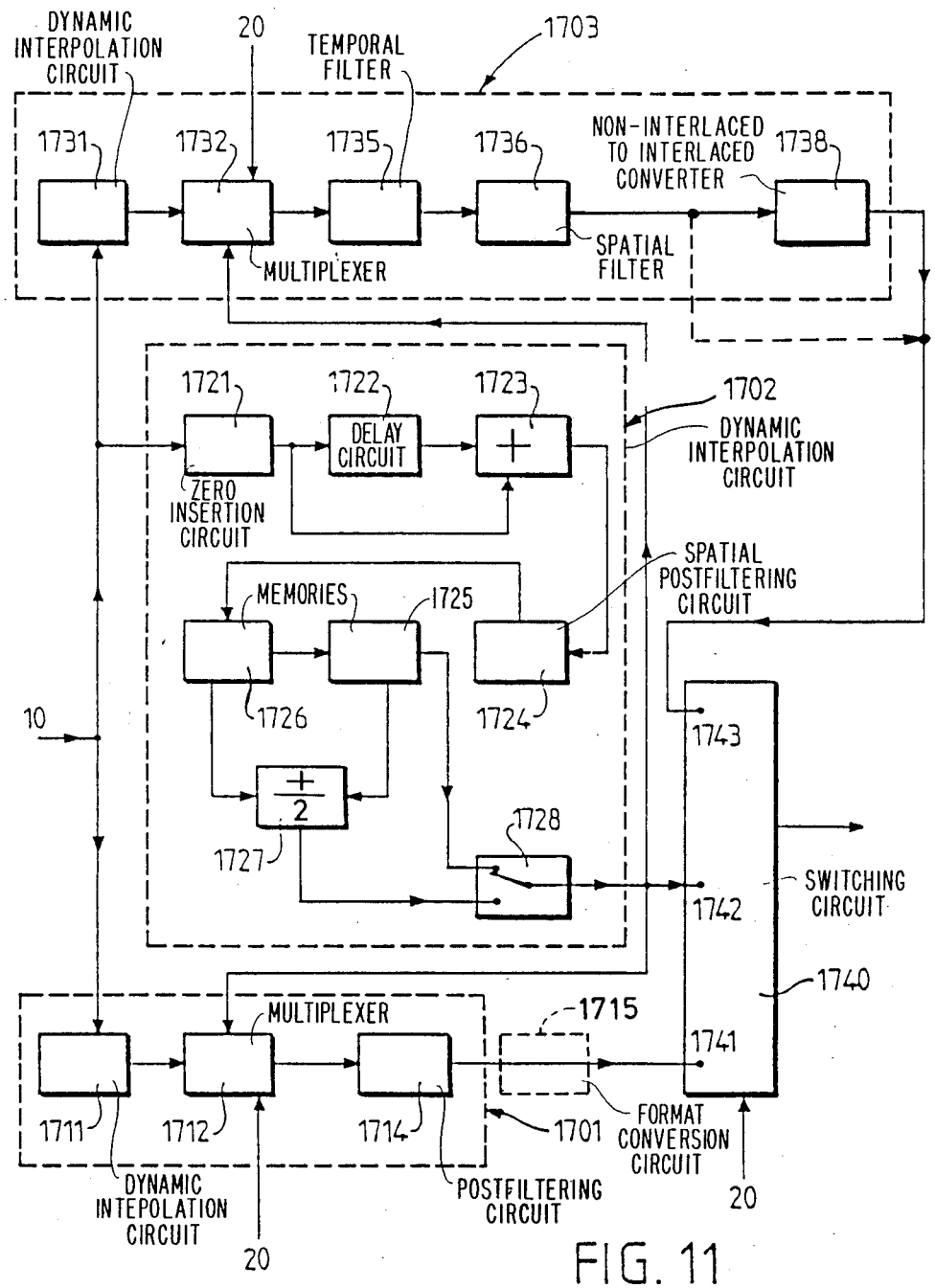
FIG. 11 shows the decoding device associated with the encoding device of FIG. 7 in the described transmission system.

On the other hand, it has been seen, hereinabove, that the invention related in the first instance to the branch 2, referred to as the 40 millisecond branch, but it is also possible to apply the principle and the implementation which are described in a system for transmission including such a branch and made up as follows. FIG. 7 shows a possible embodiment, in a system for the transmission of high-definition television images of an encoding device according to the present invention, FIG. 11 showing in a corresponding manner the decoding device associated with this encoding device in the transmission system (FIGS. 12 and 17 will show in a similar manner an improved modified embodiment of the encoding device and of the corresponding decoding device).

More specifically, the encoding device of FIG. 7 comprises first of all, in parallel, three branches 701, 702, 703 referred to here respectively as the 20 millisecond branch, the 40 millisecond branch and the 80 millisecond branch. These three branches 701 to 703, described hereinbelow, each receive, on their common input E, the high-definition images, which can have for example, the format 1250 lines, 50 Hz, 2:1, 1440 points/line, and being then organized in a succession of interlaced images, or the format 1250 l, 50 Hz, 1:1, 1440 points/line, and being then organized in a succession of sequential images.

In the second branch 702, referred to as the 40 millisecond branch, represented in FIG. 8b, the processing described hereinabove is effected, being executed in the case of FIG. 2 by the circuits 201 to 203 and, in the present case of FIG. 8b, by the circuits 721, 722, 723. More specifically, a temporal sampler 721 operating at a rate of ½ delivers for example, images of 625 lines, 25 Hz, 1:1, 1440 p./line, when the input E is in the interlaced format, or for example, images of 1250 lines, 25 Hz, 1:1, 1440 points/line when the input E is in the sequential format. These images are then received by a spatial filter 722 supplying images of 1250 lines, 25 Hz, 1:1, 1440 points/line, and then by a spatial sub-sampler 723 in line quincunx delivering images of 1250 lines, 25 Hz, 2:1, 720 p./line. The output images of the spatial sub-sample 723, which are in conformity with the image format represented in FIG. 9b, are supplied to a circuit 725 for modification of format (shuffle circuit) which, in two frames and in 40 milliseconds (thus every 20 milliseconds), sends them by groups of lines (1, 5, 9, 13, etc. ... then 3, 7, 11, 15, etc. ...) to an input of a switching circuit 740, the function of which is stated hereinbelow. The images present at the input of the spatial sub-sample 723 (connection $S_2$) are likewise set to a decision-taking circuit 770, which is described hereinbelow.

Figure 8A:
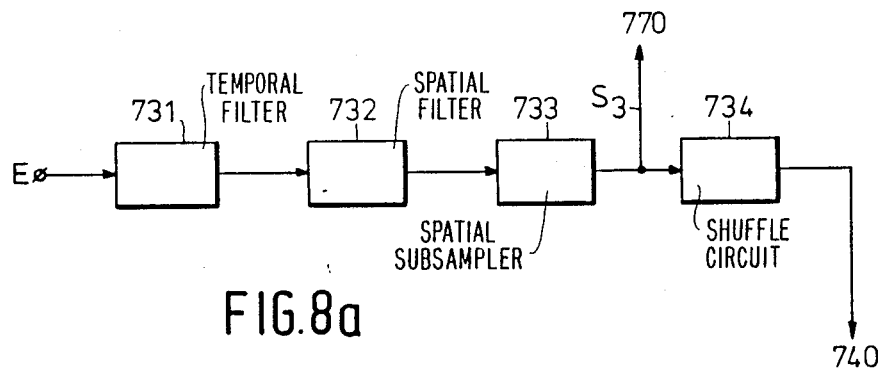
FIGS. 8a to 8c represent the three processing branches of the device of FIG. 7, FIG. 8d a modified embodiment of the branch of FIG. 8c, and FIGS. 9a to 9c the corresponding image formats at the output of the said branches.
Figure 8B:
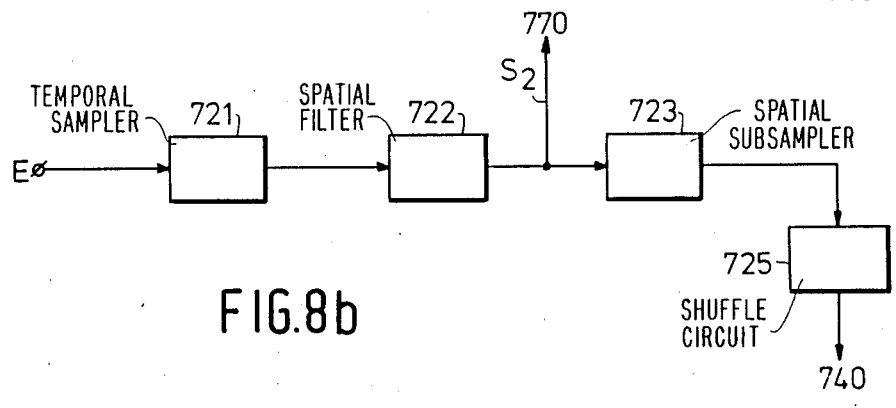
Figure 9A:
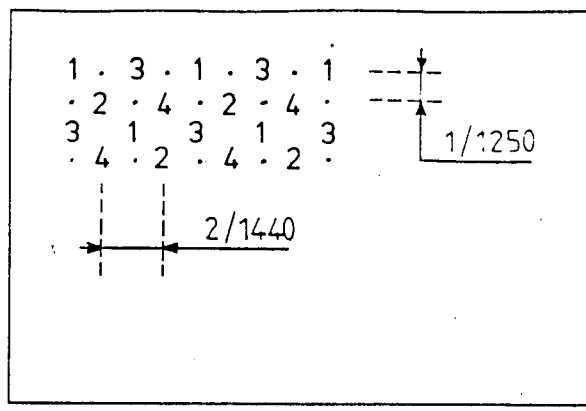
Figure 9B:
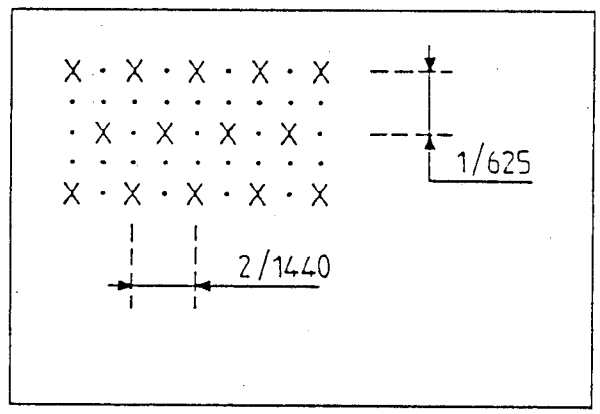

In the third branch 703, referred to as the 80 millisecond branch, represented in FIG. 8a, the succession of images E is first of all filtered temporally by a temporal filter 731, then it passes through a spatial filter 732 in order to avoid the foldings due to the spatial sub-sampling performed in the circuit 733 according to one of the four phases represented in FIG. 9a. The output of the spatial sub-sampling circuit 733 is then passed on to the decision-taking circuit 770 and to a circuit 734 referred to as a circuit for modification of format which, in four frames and in 80 milliseconds (thus every 20 milliseconds), sends them by groups of lines (1, 5, 9, 13, etc. ... then 2, 6, 10, 14, etc. ..., and so on over the 80 milliseconds or in a zig-zag) to the switching circuit 740.

Figure 8C:
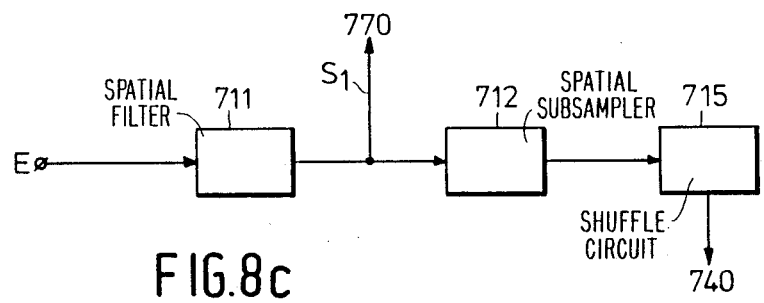
Figure 8D:
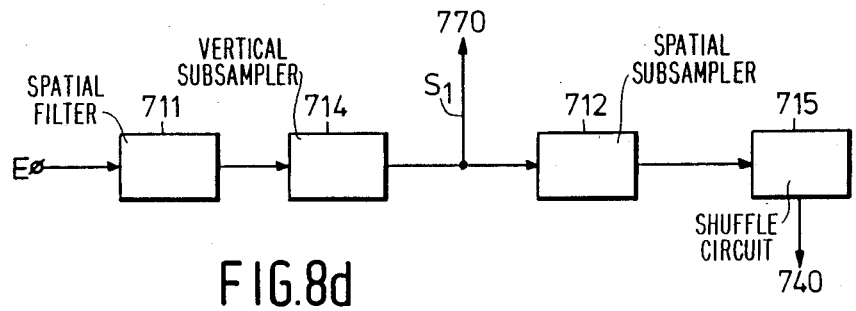
Figure 9C:
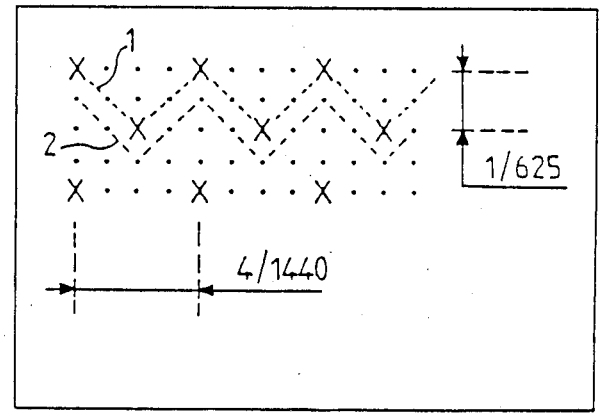

Finally, in the first branch 701, referred to as the 20 millisecond branch, represented in FIG. 8c, the sampling structure is this time such that one point in four only is retained. The branch 701 comprises a spatial filter 711 followed by a vertical sub-sampler 714 operating at a rate of ½ in the case where the input images are sequential, so as to return to for example, the format 1250 lines, 50 Hz, 2:1, 1440 points/line. In this case of sequential images, the embodiment of FIG. 8c is replaced by that of FIG. 8d. The branch 701 then comprises a spatial sub-sampler 712 operating at a rate of ¼ and in line quincunx, which provides for examples, images of 1250 lines, 50 Hz, 2:1, 360 p./line. These output images of the spatial sub-sampler 712, which are in accordance with the image format represented in FIG. 9c, are supplied to a circuit 715 for modification of format which, in two frames and in 40 milliseconds (i.e. every 20 milliseconds), sends, to a third input of the switching circuit 740, for example, first of all the samples situated in a zig-zag on the broken line designated 1, and then those situated likewise in a zig-zag but on a broken line designated 2 (see FIG. 9c). Here, only the pattern (in crosses) of FIG. 9c is important. This pattern may be transferred from one frame to another. Thus, the broken line 2 may pass via any point near a cross, including via the crosses themselves. As previously, the input images of the sub-sampler 712 (connection $S_1$) are likewise passed to a third input of the decision-taking circuit 770.

From the description which appears above, given with reference to FIGS. 7, 8a to 8c, and 9a to 9c, it emerges that the switching circuit 740 accepts on its three inputs, designated respectively 741 to 743, three sequences of images which are compressed images, because, in each one of the three branches 701 to 703, there has been the elimination of a certain number of image points. It will moreover be noted that, in each one of the three sequences thus constituted, the images contain the same number of points or samples to be transmitted per 20 milliseconds period.

The switching circuit 740 then supplies on its output a sequence of points or samples in which the content corresponding to each block of the original images will originate from one or the other of the three branches, depending upon the value of a decision signal received on an input 746 of this circuit 740 and originating from the decision-taking circuit 770.

This decision-taking circuit 770, described in the following paragraph, is preceded by a circuit 760 for the estimation of movement similar to the stage for the estimation of movement 204 of FIG. 2. This circuit 760 is itself preceded by a spatial filter 750 to pass, if this is not already the case, to a non-interlaced format and to limit the pass band. The function of the circuit 760, like the stage 204, is to determine, for each block (or set of m×n samples) non-interlaced images of a certain rank (for example images 2k+1 of odd rank) which are eliminated before transmission, a displacement vector D. More specifically, this vector D must be such that it is possible to obtain an approximation of the eliminated odd image 2k+1 on the basis of the semi-sum of the non-eliminated even images of rank 2k and 2k+2 which surround it, the error of approximation DFD associated with each block being a minimum (it has been seen hereinabove that this search aiming at rendering the error DFD a minimum was already described in earlier documents, and that the example which was given thereof was only given by way of a preferred embodiment).

Figure 10:
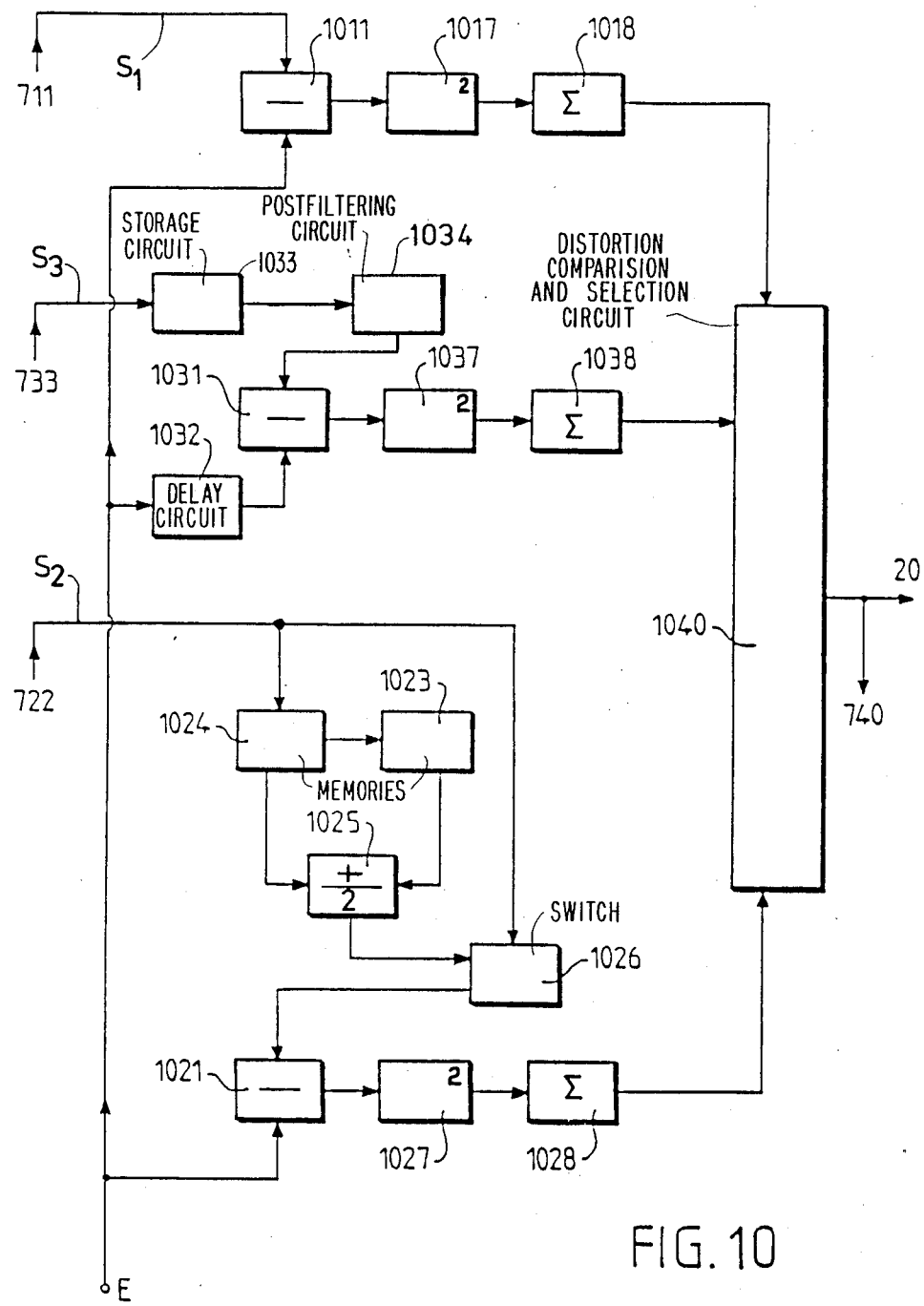
FIG. 10 shows the decision-taking circuit of the device of FIG. 7.

The decision-taking circuit 770 may now be described in detail. This circuit 770, represented in FIG. 10, comprises three channels in parallel, each comprising a comparison circuit, a squaring circuit, and a block by block summing circuit, the outputs of these three channels being passed to three corresponding inputs of a circuit 1040 for the comparison of distortions and for the selection of the branch index corresponding to the lowest among them.

The first channel, corresponding to the 20 millisecond branch, comprises a subtracter 1011, which receives on one input the input image of for example, 1250 line, 50 Hz, 1440 p./line and on another input the output $S_1$ of the filter 711 of the branch 701. This subtracter 1011 is followed by a squaring circuit 1017 and then by a summer 1018 on each block, the output of which expresses the distortion relative to the 20 millisecond branch and measured block by block.

The third channel, corresponding to the 80 millisecond branch, likewise comprises a subtracter 1031, which receives on one input, via a delay circuit 1032 intended to compensate for the delay introduced by the spatio-temporal filtering of the fixed branch 703, the input image of for example, 1250 line, 50 Hz, 1440 p./line and on another input, via a storage circuit 1033 permitting the cumulative total of four successive sub-sampled frames produced from the output $S_3$ of the circuit 733 and a postfiltering circuit 1034 performing the interpolation of the 80 millisecond branch, the output $S_3$ of the filter 733. This subtracter 1031 is followed by a squaring circuit 1037 and by a block by block summer 1038, the output of which expresses the distortion relative to the 80 millisecond branch.

The second channel, corresponding to the 40 millisecond branch, likewise comprises a subtracter 1021 receiving on one input the input image of for example, 1250 l, 50 Hz, 1440 p./line, and, on its other input, the image obtained as follows on the basis of the output $S_2$ of the filter 722. This output $S_2$ is passed on to an input terminal of a switch 1026 and on to two memories in series 1023 and 1024 which store respectively the even images which are successively transmitted. These two memories 1023 and 1024 likewise receive the displacement vector D, determined for each block by the circuit 760 for the estimation of movement with a view to obtaining an approximation of the eliminated odd image on the basis of the semi-sum of the even images. This semi-sum is formed by an adder 1025 provided at the output of the two memories 1023 and 1024. The output of the adder 1025 is itself connected to the other input terminal of the switch 1026, the output of which, originating alternately from the output of the filter 1022 or from that of the adder 1025 to reconstruct an image in the interlaced format, is then supplied to the other input of the subtracter 1021. This subtracter 1021 is followed, as in the two previous cases, by a squaring circuit 1027 and then by a block by block summer 1028, the output of which expresses the distortion relative to the 40 millisecond branch.

The distortions, thus available at the output of three channels in parallel which have just been described, are supplied, as indicated hereinabove, to the circuit 1040 which compares them and selects the lowest among them to send the corresponding branch index to the input 746 of the switching circuit 740. This branch index constitutes the said decision signal which commands in the switching circuit 740 the selection either of the output samples of the branch 701 referred to as the 20 millisecond branch or the output samples of the branch 702 referred to as the 40 millisecond branch or the output samples of the branch 703 referred to as the 80 millisecond branch, with this restriction that, in the event of finding, in the sequence of the decisions, the presence of an isolated decision, the latter is compelled to be finally a decision identical to the nearest eight. The selection thus operated hence commands the transmission of one of the three branch outputs.

Conversely, on reception, the images effectively transmitted will be processed in the decoding device of FIG. 11 with a view to a reconstruction of the original high-definition images. This decoding device comprises, as in the case of FIG. 7, three branches in parallel 1701, 1702, 1703 which each receive the images effectively transmitted and the outputs of which are received respectively on the inputs 1741, 1742, 1743 of a switching circuit 1740. These branches 1701 to 1703 are likewise referred to respectively as the 20, 40 and 80 millisecond branches.

In the branch 1702 referred to as the 40 ms branch, the sequence of the images transmitted is supplied to a dynamic interpolation circuit, comprising a circuit 1721 of the insertion of zeros between the transmitted signals, as well as a circuit 1722, placed at the output of the latter and introducing a delay of 20 milliseconds. This circuit 1721 generates, on the basis of two successive frames, an image in the format of FIG. 9b, that is to say of 40 milliseconds rate, in the non-interlaced format. This dynamic interpolation circuit is followed by an adder 1723 of the outputs of the circuits 1721 and 1722 respectively. The image of 1250 lines, 25 Hz, 1:1, 1440 p./line at the output of the adder 1723 is supplied to a spatial postfiltering circuit 1724, and then to an image reconstruction circuit comprising two memories in series 1725 and 1726 and an adder 1727 forming the semi-sum of the outputs of these memories, according to the process already described previously, in connection with the adder 444 of FIG. 4. The two memories 1725 and 1726 receive the displacement vector estimated on transmission and transmitted by the digital assistance channel 20. A switch 1728, which receives on one input the output of the memory 1725 and on the other input that of the adder 1727, finally delivers an image of 1250 lines, 50 Hz, 2:1, 1440 p./line, which is passed to the input 1742 of the switching circuit 1740. In the case where it is desired to visually display sequential images, the switch 1728 selects either the output of the memory 1725, or that of the adder 1727, at the rate of 50 Hz, so as to deliver an image of 1250 lines, 50 Hz, 1:1, 1440 points/line.

In the branch 1703 referred to as the 80 ms branch, the sequence of the image which are effectively transmitted at for example, 625 lines, 50 Hz, 2:1, 720 p./line is first supplied to a circuit 1731 referred to as the dynamic interpolation circuit, which is intended to ensure, as previously, a reinsertion of zeros between the signals effectively transmitted for this 80 ms branch. This circuit 1731 generates, on the basis of four successive frames, an image in the format of FIG. 9a, that is to say of a period of 80 milliseconds, in the non-interlaced format. In the sequence of images thus obtained, the non-zero samples, in each image of the sequence, are situated in line quincunx. These images of 1250 lines, 50 Hz, 1:1, 1440 p./line at the output of the circuit 1731 are then supplied to a multiplexer 1732, and then to a temporal filter 1735, and then to a spatial filter 1736, at the output of which an image of 1250 lines, 50 Hz, 1:1, 1440 p./line is available. Finally, a circuit 1738 for the conversion of a non-interlaced format into an interlaced format, delivers an image of 1250 lines, 50 Hz, 2:1, 1440 p./line, which is sent to the input 1743 of the switching circuit 1740. In the case of a visual display of sequential images, the signal produced from the spatial filter 173 is passed directly to the input 1743 of the circuit 1740 (connection in broken lines).

The branch 1701, referred to as the 20 ms branch, comprises simply a dynamic interpolation circuit 1711, for the insertion of zeros as previously. This circuit 1711 generates, on the basis of an input frame, an output frame according to the format of FIG. 9c, that is to say a frame of 20 milliseconds rate or an image of 40 milliseconds rate in the interlaced format. The branch 1701 then comprises a multiplexer 1712 and a spatial postfiltering circuit 1714 which delivers an image of for example, 1250 lines, 50 Hz, 2:1, 1440 p./line which is then sent to the input 1741 of the switching circuit 1740. In the case of a visual display of sequential images, the signal produced from the spatial postfiltering circuit 1714 is converted to the non-interlaced format by a format-conversion circuit 1715 (represented in broken lines) delivering an image of 1250 lines, 50 Hz, 1:1, 1440 points/line.

The output of the decision-taking circuit 770, which, on transmission, had been sent to the switching circuit 1740, is likewise sent to the digital assistance channel 20, with a view to a reconstruction of this information on decoding. The switching circuit 1740, just like the multiplexers 1712 and 1732, receive the output information of the circuit 770 transmitted by the channel 20. The circuit 1740 utilizes this decision signal to select in a corresponding manner that one of the outputs of the branches 1703, 1702 or 1701 which is appropriate: the multiplexers 1712 and 1732 either deliver simply the output signal of the circuit 1711 or 1731 respectively if the decision signal corresponds exactly to the branch concerned (the 20 ms branch 1701 or the 80 ms branch 1703 respectively), or deliver, in the opposite case, the output of the switch 1728 of the 40 ms branch 1702, restoring, depending on the particular case, the format of FIG. 9a (case of the multiplexer 1732) or that of FIG. 9c (case of the multiplexer 1712). The high-definition reconstructed image (1250 lines, 50 Hz, 2:1, 1440 p./line or 1250 lines, 50 Hz, 1:1, 1440 p./line) is thus finally available at the output of the switching circuit 1740.

Figure 12:
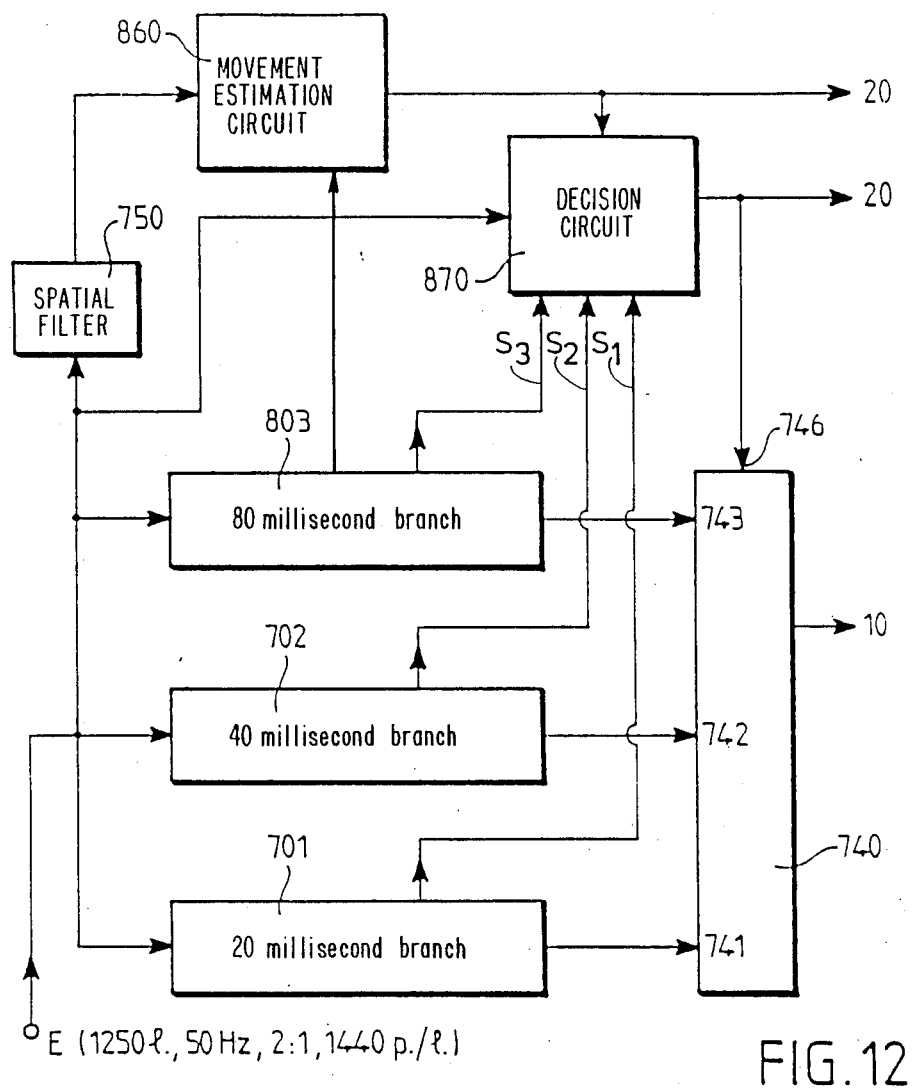
FIG. 12 shows an improved modified embodiment of the encoding device according to the invention.
Figure 17:
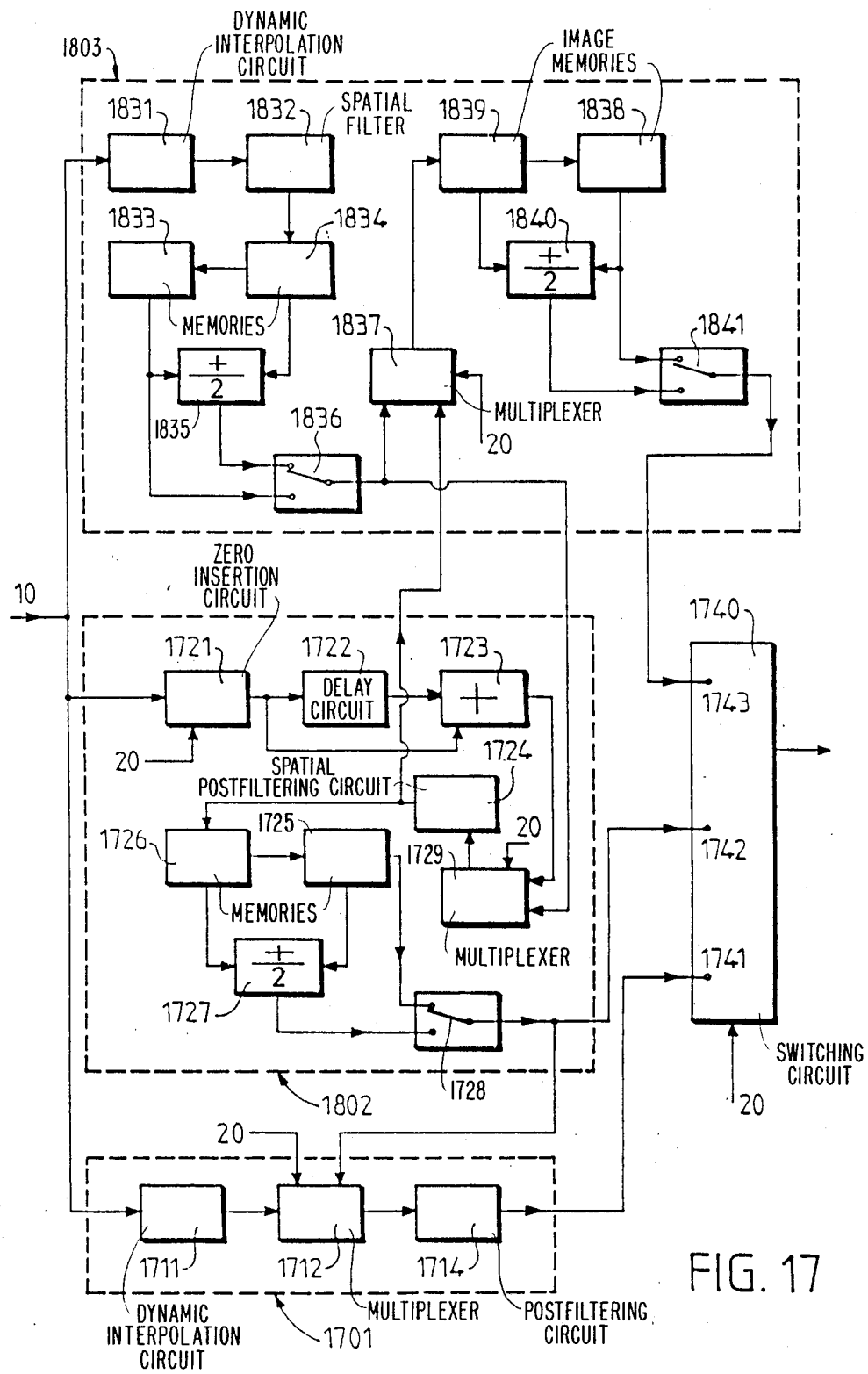
FIG. 17 shows the modified decoding device associated with the modified embodiment of the encoding device of FIG. 12.

An improved modified embodiment of the encoding device may again, as has been seen, be proposed. FIG. 12 shows this other embodiment, and FIG. 17 shows in a corresponding manner the decoding device associated with this encoding device in the transmission system.

Figure 13:
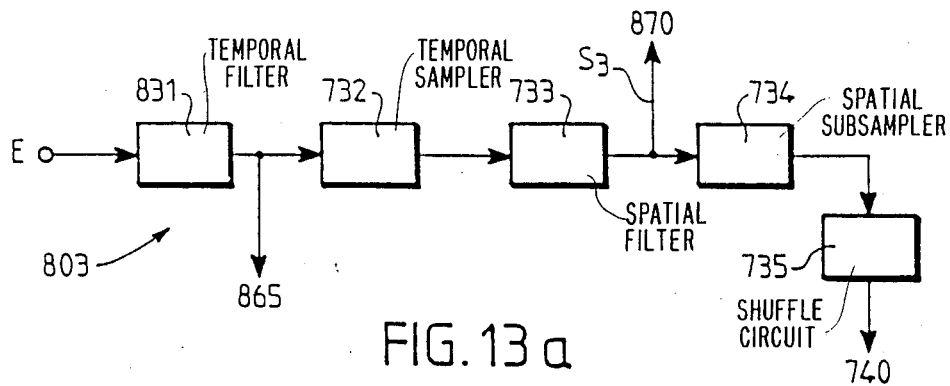
FIGS. 13a to 13c represent in detail the three processing branches of the device of FIG. 12, and FIG. 14 the temporal filter of the third of these processing branches.
Figure 13:
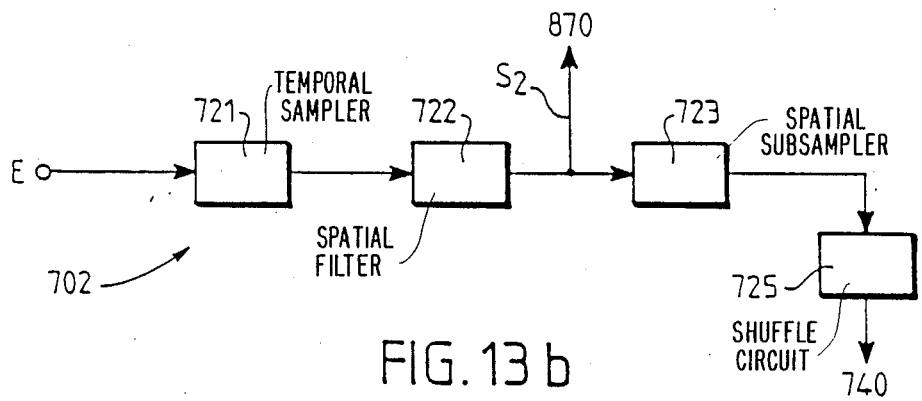
Figure 13:
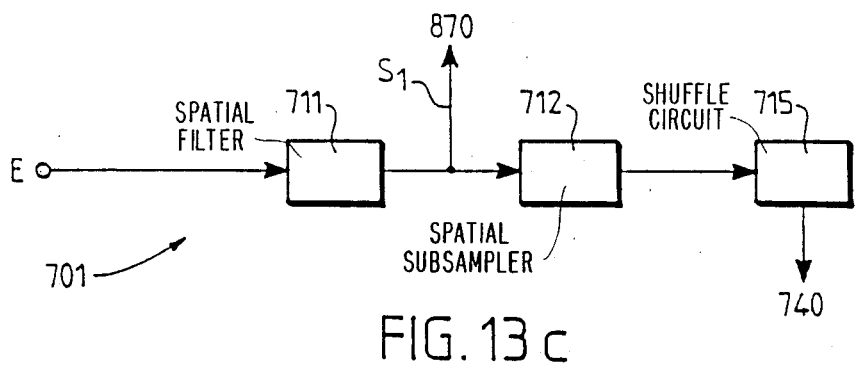

The encoding device of FIG. 12 comprises first of all in parallel, as in the case of FIG. 7, three processing branches 20, 40 and 80 ms, each receiving, on their common input E, a sequence of interlaced images of 1250 lines, 50 Hz, 2:1, 1440 p./line, and made up as indicated in FIGS. 13a to 13c.

Figure 14:
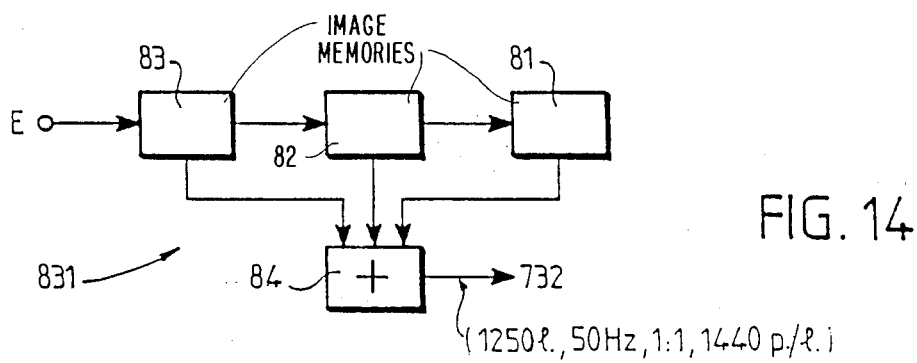

The first two branches are identical to the branches 701 and 702 of FIG. 7, that is to say that they comprise respectively the same elements 711, 712, 715 and 721, 722, 723, 725 as the latter, as they have been represented in a detailed manner in FIGS. 8c and 8b. The third branch 803 differs from the branch 703 in the sense that it comprises, in place of the simple temporal filter 731, a temporal filter 831 compensated in movement and operating on a horizon of 40 milliseconds, and comprising to this end, as indicated in FIG. 14 showing this temporal filter, three image memories 81, 82, 83 and a adder 84. This temporal filter 831 delivers images of for example, 1250 lines, 50 Hz, 1:1, 1440 p./line, and is then followed by the same circuits as those encountered in the branch 703, namely the temporal sampler 732 operating at a rate of ¼ which delivers images of for example, 1250 lines, 12.5 Hz, 1:1, 1440 p./line, the spatial filter 733, which permits the limiting of the band of the signal and the avoidance of the folding of the spectrum due to the sub-sampling peformed, and the spatial sub-sampler 734 operating at a rate of ½ and in the line quincunx, which delivers images of for example, 1250 lines, 12.5 Hz, 1:1, 720 p./line in conformity with the image format of FIG. 9a. The output images of the sub-sampler 734 are, as in the branch 703, supplied to a circuit 735 for modification of format which is identical to the circuit 725 and which passes them itself to the switching circuit 740.

As previously, the switching circuit 740 supplies on its output a sequence of points or samples in which the content corresponding to each block of the original images originates, by one of inputs 741 to 743, from one or the other of the three branches 701, 702, 803 depending upon the value of the decision signal received on the input 746. This decision signal originates from a decision circuit 870, itself preceded by a stage for estimation consisting of a circuit for the estimation of movement 860.

Figure 15:
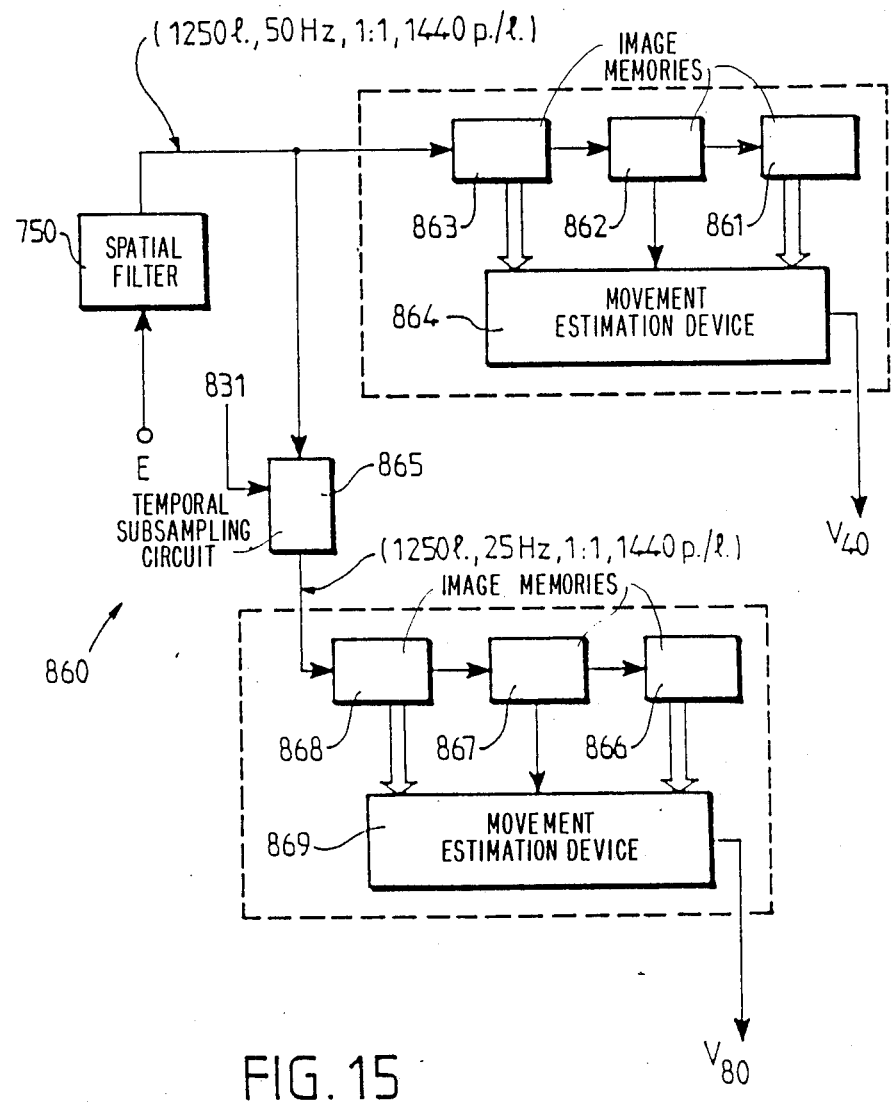
FIGS. 15 and 16 represent in a more detailed manner the circuit for the estimation of movement and the decision circuit of the encoding device of FIG. 12.

This circuit 860, represented in FIG. 15, comprises on the one hand a first assembly of circuits which is identical to the circuit for the estimation of movement 760 and thus composed of three image memories 861, 862, 863 and of a device for the estimation of movement 864. In parallel on this first assembly 861 to 864 there is provided a temporal sub-sampling circuit 865 intended to divide by two the time rhythm of the succession of sequential images which is supplied to the said first assembly. This circuit 865, which likewise receives the output of the temporal filter compensated in movement 831, is followed by a second set likewise comprising three image memories 866, 867, 868 amd a device for the estimation of movement 869.

The circuit for the estimation of movement 860, itself preceded (see FIG. 12) by a spatial filter 750 for the conversion of an interlaced format into a non-interlaced format, is intended to supply not a succession of displacement vectors but two groups of such displacement vectors, designated $V_{40}$ and $V_{80}$, in association with the respective time rhythm of the corresponding succession of images.

Figure 16:
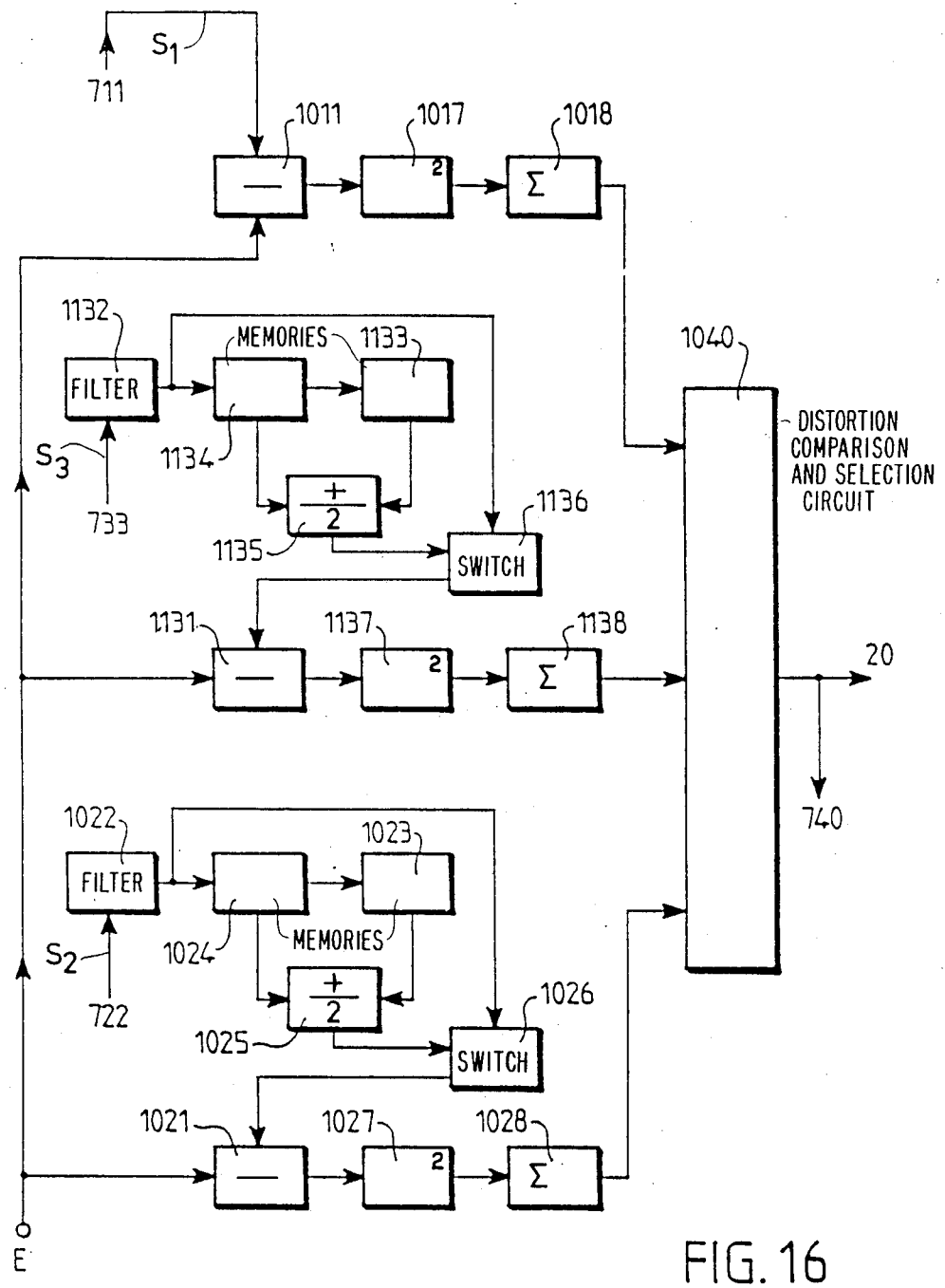

The decision circuit 870 is also of the same nature as the circuit 770, with the sole difference that the signal $S_3$ (see FIG. 8a) received by the circuit 870 undergoes in this case a filtering compensated in movement. As shown by FIG. 16, the circuit 870 therefore comprises three channels in parallel but two a which, the second and third channels, are identical to what they were in the circuit 770 and comprise the same elements 1011, 1017, 1018 and 1021 to 1028. The third channel is modified in the sense that it now comprises, just like the second channel of the decision circuit 770 of FIG. 10, elements 1131 to 1138 which are absolutely identical to the elements 1021 to 1028 of this Figure and FIG. 10 and assisting in the same objective.

Conversely, on reception, the images effectively transmitted after encoding in the device of FIG. 12 will be processed in the decoding device of FIG. 17 with a view to the reconstruction of the original high-definition images. This decoding device comprises first of all, as in the case of FIG. 7, on transmission, and of FIG. 11, on reception, three branches in parallel 1701, 1802, 1803, referred to as the 20, 40 and 80 ms branches, receiving the images transmitted and the outputs of which are received on the inputs 1741 to 1743 of the switching circuit 1740.

The first branch 1701 is identical to what it was in the embodiment of FIG. 11. The second branch 1802 is virtually identical to the branch 1702 of FIG. 11, apart from the sole difference that the interpolation circuit is modified and now comprises likewise a multiplexer 1729, provided in series between the adder 1723 and the spatial postfiltering circuit 1724. This modified dynamic interpolation circuit is intended to generate a regular pattern by taking either the data transmitted on two successive frames for the blocks processed in 40 ms and 20 ms or the data originating from 80 ms branch.

The third branch 1803 comprises a dynamic interpolation circuit 1831 which, based on four successive frames of the sequence of the transmitted images, reconstructs an image of for example, 1250 lines, 12.5 Hz., 1:1, 1440 p./l, and then a spatial filter 1832, at the output of which an image of 1250 lines, 12.5 Hz, 1:1, 1440 p./line is available. This image is then supplied to a circuit for image reconstruction comprising two memories in series 1833 and 1834, receiving the displacement vector $V_{80}$ estimated on transmission and transmitted by the digital assistance channel 20, an adder 1835 effecting the semi-sum of the output of these memories, and a switch 1836 which receives on one input the output of the memory 1833 and on the other input that of the adder 1835 and delivers and image of 1250 lines, 25 Hz, 1:1, 1440 p./line. This image is transmitted to a multiplexer 1837, which likewise receives the output of the spatial postfiltering circuit 1724, and to the multiplexer 1729 of the dynamic inter-polation circuit of the second branch 1802. The multiplexer 1837 is itself followed by another circuit for image reconstruction comprising, like the previous one, two image memories 1838 and 1839, and adder 1840 effecting the semi-sum of these memories, and a switch 1841 which receives on the one hand the output of the memory 1838 and on the other hand that of the adder 1840 and delivers an image of 1250 lines, 50 Hz, 2:1, 1440 p./line. The two memories 1838 and 1839 receive, on this occasion, only the semi-displacement vector $V_{80}/2$, because the inter-polation interval is 40 ms, that is to say of one half the amplitude, and the output of the switch 1841 is passed to the input 1743 of the switching circuit 1740.

This switching circuit 1740 receives not only the outputs of the three branches 1701, 1802, 1803, but likewise, on its input 1746, the output of the decision-taking circuit 870 obtained on transmission and passed, like the estimated displacement vectors, to the digital assistance channel 20 with a view to the reconstruction of this information on decoding. This output of the decision-taking circuit 870 is likewise supplied to the multiplexer 1837, as well as to the dynamic interpolation circuits of the 20 ms branch 1701 and of the 40 ms branch 1802. The switching circuit 1740 utilizes, as previously, this decision signal to select in a corresponding manner that one of the outputs of the branches 1701, 1802, 1803 which is appropriate.

After the description of the various encoding and decoding devices which have just been detailed, finally it will stated that it is possible to provide, in a corresponding manner on transmission as also on reception, in each one of the first, second and third processing branches, an interrupter permitting the placing out of circuit of the processing branch in which it is placed. Thus, an encoding device according to the invention can be constituted, as has been described, of the three branches mentioned, or alternatively can be constituted only by two of them, the first and third, or first and second, or second and third, or alternatively can be constituted only by one of these three exclusively. Naturally, the structure of the decoding device is directly associated, on this point, with that of the encoding device, and the openings or closings of the respective interrupters of the corresponding branches will be commanded in a strictly similar manner on encoding and on decoding. The various modified embodiments which result therefrom are not described in greater detail, since they do not pose any particular constructional problem.

Another modified embodiment of the encoding device according to the invention can be described in the case where the rate of temporal sub-sampling is equal to 2. It has in fact been seen, in the aforegoing description, that the objective of the principle and of the modes of implementation proposed was to transform a series of high-definition images into compressed images, the video passed band compression thus effected being intended to permit compatibility with for example the current television standard of 625 interlaced lines, 50 Hz, of pass band close to 6 MHz.

However, it is found that the succession of the compressed images, referred to as compatible images, may be affected by faults manifesting themselves in the form of jerks (due to the frequency of 25 Hz of the images) in image regions processed by a 40 millisecond branch. The temporal filtering proposed in a complementary manner permits the elimination or at least the reduction of this fault, while ensuring in an effective manner the reconstruction of the movement between successive compatible images.

FIG. 18a shows the construction of this temporal filtering in the encoding device, and FIG. 18b shows in a corresponding manner the implementation of the inverse filtering in the associated decoding device. In FIG. 18a, the reference 1900 designates on an overall basis the encoding circuit as previously described in one or the other of the proposed embodiments. This encoding circuit 1900 therefore receives the high-definition images of 1250 lines, 50 Hz, 2:1, 1400 p./l and delivers the compressed images referred to as compatible, of 625 lines, 50 Hz, 2:1, 720 p./l. The sequence of the compressed images is then supplied to a temporal filtering circuit 1910, which received likewise from the device 1900 the displacement vector D selected by the circuit for the estimation of movement and the decision signal, designated DEC, emitted by the decision-taking circuit (these quantities $\hat{D}$ and DEC are likewise provided, it may be recalled, to the digital assistance channel 20 to be reused on reception in the decoding device). The output of the temporal filtering circuit 1910 is passed to the analogue transmission channel 10.

On reception, as shown by FIG. 18b, the signals originating from this channel 10 are received by an inverse temporal filtering circuit 1950, and the sequence of compressed images present at the output of this circuit is reconverted by the decoding circuit 1960 (in one of the described embodiments of decoding circuit) into a succession of high-definition images ready to be visually displayed. The decoding circuit 1960 likewise returns to the inverse temporal filtering circuit 1950 the displacement vector $\hat{D}$ and the decision signal DEC.

Figure 19:
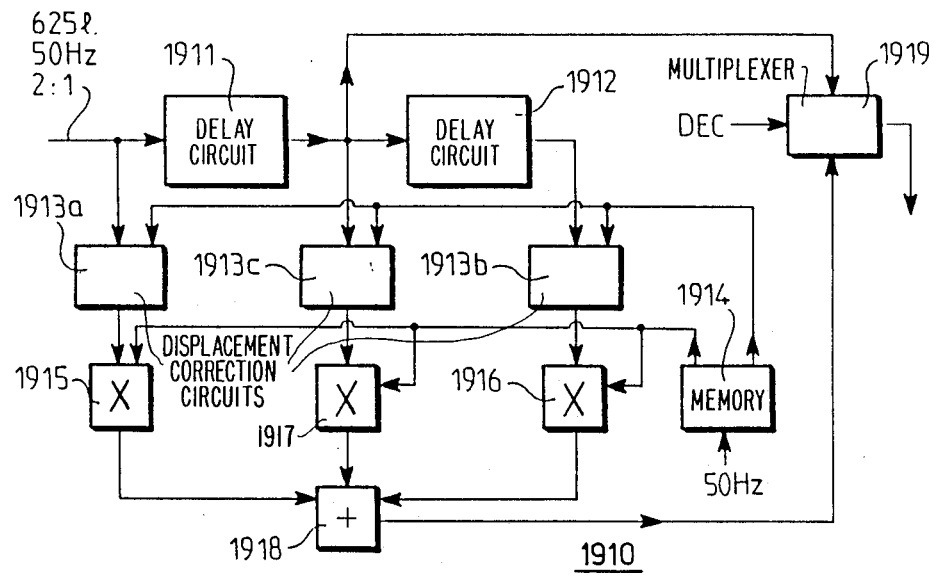
FIGS. 19 and 20 show in more detailed manner the circuit for temporal filtering compensated in movement, used in the encoding device, and the inverse temporal filtering circuit used in the associated decoding device.

FIG. 19 shows in a more detailed manner a preferred embodiment of the temporal filtering circuit 1910, which comprises in the described example two delay circuits (or frame memories) 1911 and 1912 in series, three circuits 1913a, 1913b and 1913c for correction of displacement which are connected respectively to the input of the first delay circuit 1911, to the output of the second delay circuit 1912 and to the input common to these two delay circuits, a read-only memory 1914 commanded by the frequency of the images (50 Hz), three multipliers 1915, 1916 and 1917 connected respectively to the output of the first, second and third displacement correction circuits 1913a, 1913b, 1913c, and adder 1918 of the three respective outputs of the three multipliers 1915 to 1917, and a multiplexer 1919.

The principle of this circuit 1910 consists in effecting in the image zones processed by the 40 ms branch a weighted sum of the successive images in the direction of the movement. This filtering is undertaken on three successive frames, and the delays contributed by the delay circuits 1911 and 1912 are then 20 milliseconds. The weighting factors sent to the multipliers, a for the multiplier 1917 and $(1-a)/2$ for the multiplier 1915 and 1916, are a function of the estimated displacement vector $\hat{D}$, as will be stated hereinbelow.

The displacement correction circuits 1913a, 1913b, 1913c are delay circuits, the delays of which are likewise, for two of them, linked to the vector $\hat{D}$. The displacement correction circuit 1913c introduces, in fact, a dealy $T_o$ which is equal to the sum of the two maximum delays or offsets which can be observed horizontally and vertically between two successive images of the sequence of the compressed images, having regard to the category of movement of the said images. The displacement correction circuits 1913a and 1913b then introduce respective delays $T_o+dT$ and $T_o-dT$ where dT represents the sum of the two delays of offsets actually observed, having regard to the movement actually found and therefore to the estimated displacement vector $\hat{D}$ (the quantity 2dT is the delay or offset corresponding to the said estimated vector $\hat{D}$ of components $D_x$, $D_y$).

The multiplexer 1919 receives on the one hand the output of the adder 1918, on the other hand the compressed image available at the output of the delay circuit 1911, and likewise the decision signal DEC. When this signal DEC indicates that an image block is processed by the 40 ms branch, the multiplexer 1919 selects the output of the adder 1918, that is to say the compressed image temporary filtered, otherwise it selects the ouput of the circuit 1911. Moreover, in the case where the multiplexer 1919 selects the filtered image, a is alternately a function of the displacement vector $\hat{D}$ as indicated hereinabove, or on the other hand equal to 1, depending upon the parity of the frames (for example equal to 1 for the odd frames and a function of $\hat{D}$ for the even frames). The memory 1914 is intended to supply to circuits 1913a, 1913b and 1913c the appropriate values of the components $D_x$ and $D_y$ of the displacement vectors $\hat{D}$ and to the multipliers 1915 to 1917 the appropriate values of a.

Figure 20:
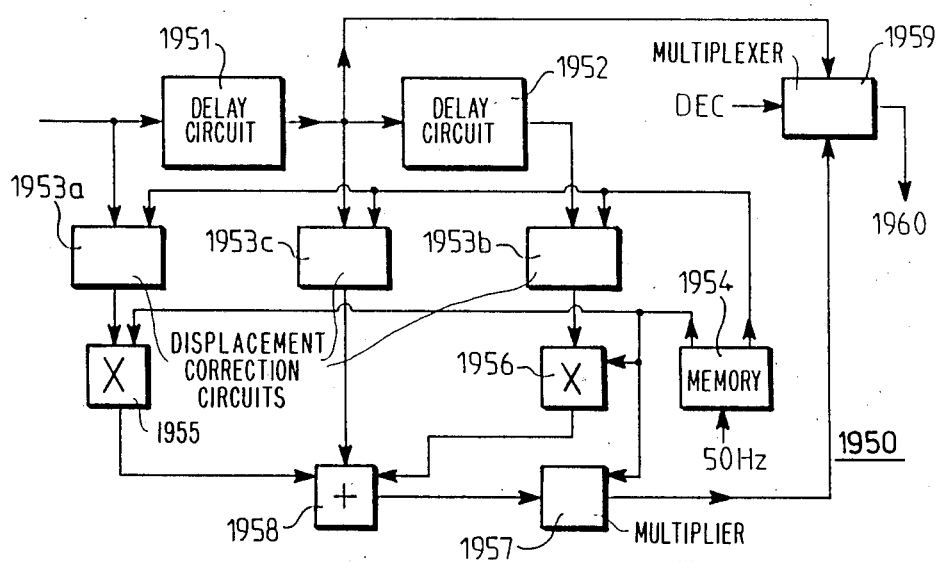

On reception, the filtering effected by the inverse temporal filtering circuit 1950 is very similar to that of the circuit 1910. FIG. 20 shows a preferred embodiment of the circuit 1950, which is fact comprises two delay circuits 1951 and 1952, contributing a delay of 20 milliseconds each, three displacement correction circuits 1953a, 1953b and 1953c, connected respectively to the input of the first delay circuit 1951, to the output of the second delay circuit 1952, and to the point common to these two delay circuits, two multipliers 1955 and 1956 by $(1-a)/2$, connected to the output of the displacement correction circuits 1953a and 1953b respectively, an adder 1958 of the output of the third displacement correction circuit 1953c and of the two respective outputs of the two multipliers 1955 and 1956, a multiplier 1957 of the output of the adder by 1/a, and a multiplexer 1959 receiving on the one hand, on a first input, the output of the multiplier 1957 and on the other hand, on a second input, the compressed image, taken at the output of the first delay circuit 1951.

As previously, this multiplexer selects one of its two input signals, depending upon the value adopted by the decision signal DEC which it receives on a third input, and sends the signal thus selected to the decoding circuit 1960, the value of a being moreover, as in the case of the direct filtering, equal to 1 or a function of the estimated displacement vector, depending upon the parity of the frames.

On transmission, as on reception, the temporal filtering thus implemented might degrade the performances of the system in relation to the noise if the value of the weighting factor a were not judiciously selected. In fact, the benefit of a low value of a is to reduce the jerks and to improve the quality of the compatible images, but the mentioned degradation is the more marked as a becomes smaller. The compromise adopted consists, in fact, in selecting for the factor a value which is a function of the displacement vector. The lower the displacement vector, the closer is a to 1 (low filtering), and, conversely, the greater the movement, the smaller is a and the more intense is the filtering and the greater is the extent to which the jerks are eliminated. FIG. 21 shows some discrete examples of values which can be adopted by the factor, depending upon the values which are adopted by the actual component $D_x$ and $D_y$ of the estimated displacement vector in the plane of the images, for example a=1, a=0.75, a=0.5, etc. . . . , for speed components expressed in image points per second.

Figure 22:
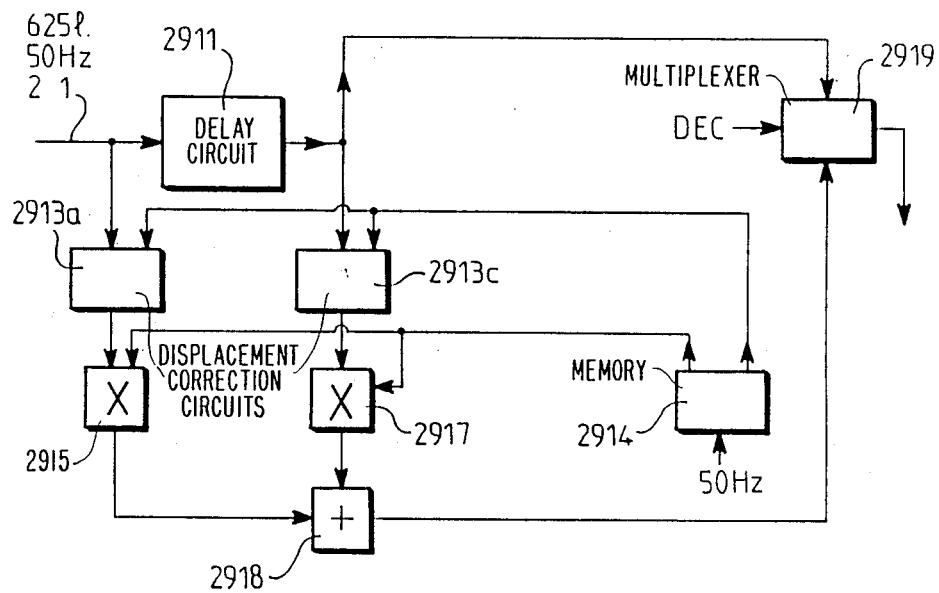
FIGS. 22 and 23 show modified embodiments of the direct and inverse temporal filtering circuits of the encoding and decoding devices of FIGS. 18a and 18b.
Figure 23:
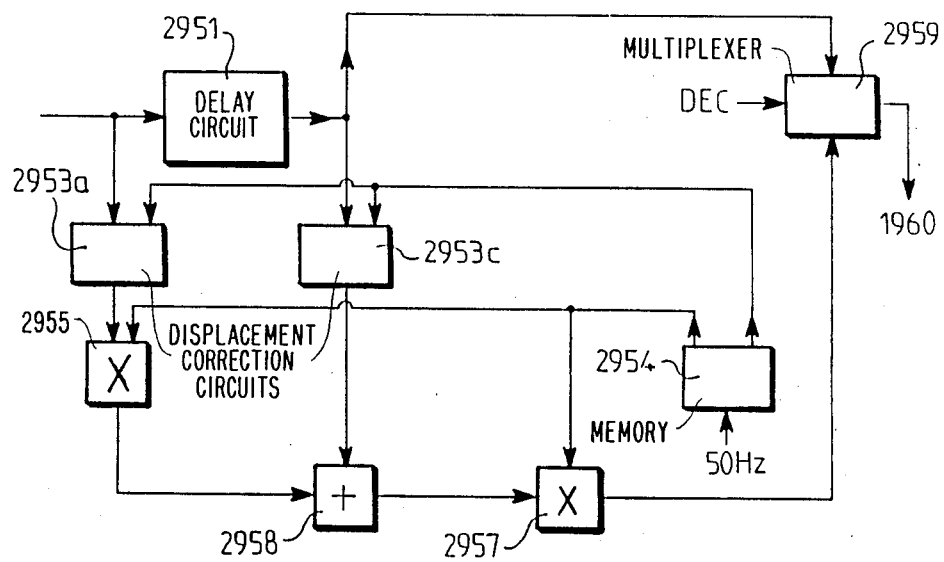

The invention is, of course, not limited to the embodiments which have just been described and represented, on the basis of which modified embodiments may be proposed without thereby departing from the scope of the invention. In particular, the structure of the temporal filtering circuit 1910 may be modified, for example by eliminating one of its parallel channels, as indicated in FIG. 22. The elements 1911 to 1919 of FIG. 19 are now replaced by identical elements 2911 to 2919, with the exception of the elements 1912, 1913b, 1916 which are elminated. Moreover, the weighting factor passed to the multiplier 2915 is in this case equal to 1-a, in place of $(1-a)/2$ for the multiplier 1915. The inverse temporal filtering circuit of FIG. 23, corresponding to the direct filtering circuit of FIG. 22, exhibits similar modifications in relation to FIG. 20, namely that the elements 1951 to 1959 are replaced by identical elements 2951 to 2959, with the exception of the elements 1952, 1953b, 1956, which are eliminated, and of the multiplier 1955, which becomes a multiplier 2955 receiving the weighting factor 1-a in place of $(1-a)/2$. Moreover, the delays introduced by the displacement correction circuits 2913a and 2953a are now equal to $T_o+dT$, and those of the circuits 2913c and 2953c equal to $T_o-dT$.

APPENDIX $$\hat{I}(X, 2k+1) = \frac{I(X-D, 2k) + I(X+D, 2k+2)}{2} \quad (1)$$

APPENDIX-continued $$\sum_{blocks} [I(X, 2k + 1) - \hat{I}(X, 2k + 1)]^2 \quad (2)$$

$$\sum_{blocks} [DFD(X, D_x)]^2 \quad (3)$$

$$\hat{I} = \frac{I(X - D_{min2}, 2k) + I(X + D_{min2}, 2k + 2)}{2} \quad (4)$$

We claim:

1. A device for spatio-temporally sub-sampling digital video signals representing a succession of images divided into blocks of m×n points (m and n being positive integers), said device comprising:
    (a) means for spatially prefiltering said sequence of images to provide a sequence of band width limited images;
    (b) means, coupled to said prefiltering means, for spatio-temporally sub-sampling said band width limited images;
    (c) movement estimation means coupled to said sub-sampling means, comprising:
        i. means for delivering signals corresponding to an odd image and even images surrounding said odd image in said sequence of images; and
        ii. means, coupled to said delivering means, for estimating a motion vector which relates said odd image to said even images.

2. A device according to claim 1, further comprising a temporal sub-sampling circuit supplying a succession of images at a lower time rate than that of the original images.

3. In a system for the transmission of high-definition television images comprising a stage for the transmission of encoded information representing said images and, after transmission by means of a limited pass-band analogue channel involving processing to reduce the quantity of information to be transmitted, a stage for the reception of the transmitted information, said transmission stage characterized in that it comprises, in its encoding part, a device according to claim 1.

4. A system for the transmssion of high-definition television images comprising a stage for the transmission of encoded information representing said images and, after transmission by means of a limited pass-band analogue channel involving processing to reduce the quantity of information to be transmitted, a stage for the reception of the transmitted information, wherein said transmission stage comprises, in its encoding part, a device according to claim 1, said device being connected to a digital assistance channel intended to ensure the transmission to the reception state of said motion vector.

5. The device described in claim 1, further comprising means for storing said odd image and two of said even images surrounding said odd image, said storage means having three outputs coupled to said movement estimation means, for providing said odd and even images respectively, and wherein said movement estimation means utilizes a block correlation method of estimate said motion vector.

6. A maintenance temporal filtering circuit providing an input to said device described in claim 1, said circuit comprising:
    (a) means for imposing a delay equal to the time interval between two original successive images;
    (b) an adder; and
    (c) means for temporally sub-sampling the output of said adder, said temporal sub-sampling circuit providing said sequence of images to said device at a lower time rate than that of said two original successive images.

7. In a system for the transmission of high-definition television images comprising a stage for the transmission of encoded information representing said images and, after transmission by means of a limited pass-band analogue channel involving processing to reduce the quantity of information to be transmitted, a stage for the reception of the transmitted information characterized in that it comprises, in its decoding part, a device for reconstructing images itself comprising, in series, a spatial postfiltering circuit intended to undertake a spatial interpolation in the sequential images transmitted by the analogue channel a stage for the compensation of movement, a switch intended to deliver a succession of sequential images, and a format-conversion circuit for the transformation of said succession of sequential images into a succession of interlaced images ready to be visually displayed, said stage for the compensation of movement itself comprising two image memories in series for the storage of the images successively transmitted by the analogue channel and post-filtered and an adder to form the semi-sum of said transmitted images, and said switch receiving alternately, at a first input, the output of the said stage for the compensation of movement and, at a second input, the output of the said spatial post-filtering circuit by means of a delay circuit providing a delay equal to an interlacing period.

8. The system of claim 7, wherein said reception stage is followed by an interpolation circuit comprising a delay circuit and a switch and intended to transform the succession of output images of the said device into a succession of interlaced images.

9. In a system for the transmission of high-definition television images comprising a stage for the transmission of encoded information representing said images and, after transmission by means of a limited pass-band analogue channel involving processing to reduce the quantity of information to be transmitted, a stage for the reception of transmitted information characterized in that it comprises, in its decoding part, a device for reconstructing images itself comprising, in series, a spatial post-filtering circuit intended to undertake a spatial interpolation of the sequential image transmitted by the analogue channel, a stage for the compensation of movement, and a switch intended to deliver a succession of said sequential images ready to be visually displayed, said stage for the compensation of movement itself comprising two image memories in series for the storage of said sequential images transmitted by the analogue channel and post-filtered and an adder to form the semi-sum of said transmitted images, and said switch receiving alternately, at a first input, the output of said stage for the compensation of movement and, at a second input, the output of the said spatial post-filtering circuit by means of a delay circuit providing a delay equal to an interlacing period.

* * * * *